United States Patent
Dong et al.

(10) Patent No.: US 12,003,410 B2
(45) Date of Patent: Jun. 4, 2024

(54) METHOD AND APPARATUS FOR ESTABLISHING FORWARDING PATH, AND COMPUTER-READABLE STORAGE MEDIUM

(71) Applicant: Huawei Technologies Co., Ltd., Shenzhen (CN)

(72) Inventors: Jie Dong, Beijing (CN); Zongpeng Du, Shenzhen (CN); Xiaodong Chang, Beijing (CN)

(73) Assignee: HUAWEI TECHNOLOGIES CO, LTD., Shenzhen (CN)

( * ) Notice: Subject to any disclaimer, the term of this patent is extended or adjusted under 35 U.S.C. 154(b) by 0 days.

(21) Appl. No.: 17/947,316

(22) Filed: Sep. 19, 2022

(65) Prior Publication Data

US 2023/0015960 A1 Jan. 19, 2023

Related U.S. Application Data

(63) Continuation of application No. PCT/CN2021/077909, filed on Feb. 25, 2021.

(30) Foreign Application Priority Data

Mar. 20, 2020 (CN) .......................... 202010202701.9

(51) Int. Cl.
*G06F 15/16* (2006.01)
*H04L 45/12* (2022.01)
(Continued)

(52) U.S. Cl.
CPC ............ *H04L 45/24* (2013.01); *H04L 45/123* (2013.01); *H04L 45/28* (2013.01); *H04L 47/762* (2013.01)

(58) Field of Classification Search
CPC ....... H04L 45/24; H04L 47/762; H04L 47/78; H04L 45/34
See application file for complete search history.

(56) References Cited

U.S. PATENT DOCUMENTS

| | | | |
|---|---|---|---|
| 11,228,526 B2 | 1/2022 | Du et al. | |
| 2003/0090995 A1* | 5/2003 | Illikkal | H04J 14/0283 370/222 |

(Continued)

FOREIGN PATENT DOCUMENTS

| | | |
|---|---|---|
| CN | 107612825 A | 1/2018 |
| CN | 109962850 A | 7/2019 |

(Continued)

*Primary Examiner* — Hieu T Hoang
(74) *Attorney, Agent, or Firm* — SLATER MATSIL, LLP

(57) ABSTRACT

A method and an apparatus for establishing a forwarding path, the method including obtaining, by a first network node, path information of a to-be-established forwarding path, where the path information comprises an identifier of a network node on the forwarding path and a transmission resource requirement that needs to be allocated by the network node to the forwarding path, and sending a path establishment request packet based on the path information, where a packet header of the path establishment request packet comprises the path information, and where the path establishment request packet triggers the network node to allocate a transmission resource to the forwarding path based on the transmission resource requirement.

19 Claims, 8 Drawing Sheets

| Type (type) | Length (length) | Flags (flags) | Reserved (reserved) |
|---|---|---|---|
| Path type (path type) | Path identifier (path ID) | | Resource requirement |

(51) Int. Cl.
     *H04L 45/24*         (2022.01)
     *H04L 45/28*         (2022.01)
     *H04L 47/762*       (2022.01)

(56) References Cited

U.S. PATENT DOCUMENTS

| | | | |
|---|---|---|---|
| 2008/0069010 A1* | 3/2008 | Zhang | H04L 45/10 |
| | | | 370/254 |
| 2018/0013511 A1* | 1/2018 | Hussain | G02B 6/12033 |
| 2018/0019944 A1* | 1/2018 | Peng | H04L 45/34 |
| 2020/0162376 A1* | 5/2020 | Du | H04L 45/22 |
| 2022/0103477 A1* | 3/2022 | Peng | H04L 45/306 |
| 2022/0191138 A1* | 6/2022 | Dong | H04L 45/302 |

FOREIGN PATENT DOCUMENTS

| | | |
|---|---|---|
| CN | 110247787 A | 9/2019 |
| CN | 110535782 A | 12/2019 |
| CN | 110677918 B | 7/2021 |
| EP | 4120742 A1 * | 1/2023 |

\* cited by examiner

SID1: A1::A102:1001:YXXX

Locator　Function　Path identifier　Resource parameter

⎫ Arguments

A: Establish a forwarding path
B: Feed back that the path is successfully established
C: Feed back that the path fails to be established
D: Delete the forwarding path
E: Transfer a message by using an ICMP packet

SID2: A1::102:1001:YXXX:A

Locator　Function　Path identifier　Resource parameter　Operation identifier

⎫ Arguments

0: Identifier of a FlexE client
1: Transmission resource requirement information
2: Error code
3: Undefined

FIG. 5

| Type (type) | Length (length) | Flags (flags) | Reserved (reserved) |
|---|---|---|---|
| Path type (path type) | | Path identifier (path ID) | Resource requirement |

FIG. 6

METHOD AND APPARATUS FOR ESTABLISHING FORWARDING PATH, AND COMPUTER-READABLE STORAGE MEDIUM

CROSS-REFERENCE TO RELATED APPLICATIONS

This application is a continuation of International Application No. PCT/CN2021/077909, filed on Feb. 25, 2021, which claims priority to Chinese Patent Application No. 202010202701.9, filed on Mar. 20, 2020. The disclosures of the aforementioned applications are hereby incorporated by reference in their entireties.

TECHNICAL FIELD

This application relates to the field of data transmission technologies, and in particular, to a method and an apparatus for establishing a forwarding path, and a computer-readable storage medium.

BACKGROUND

A segment routing over internet protocol version 6 (IPv6) dataplane (Segment Routing over IPv6 dataplane, SRv6) network is an IPv6 network to which a segment routing (Segment Routing) technology is applied. The SRv6 network may include a control node and a plurality of network nodes. The control node is configured to establish a forwarding path including the network nodes on the SRv6 network, and the network nodes on the forwarding path are configured to transmit packets in a data flow.

A packet forwarding mechanism on the SRv6 network may be as follows. For any IPv6 packet to be transmitted on the forwarding path, an ingress network node on the forwarding path may encapsulate an IPv6 packet header having a segment routing header (SRH) into the IPv6 packet, to obtain a target packet. A segment identifier list (SID list) in the SRH includes SIDs of the network nodes on the forwarding path. When receiving the target packet, the network node on the forwarding path may sequentially send the target packet to a next-hop network node on the forwarding path based on a sequence of the SIDs in the SID list.

When forwarding the target packet, each intermediate network node on the forwarding path in the packet forwarding mechanism needs to locally search for the SID and modify the packet header of the target packet, to increase forwarding processing time and reduce data forwarding efficiency. To improve data forwarding efficiency, the data flow may be transmitted on a connection-oriented forwarding path. For example, the data flow may be transmitted on a flex Ethernet (FlexE) cross-connected path.

A process of transmitting the data flow on the FlexE cross-connected path may be as follows. One data flow may correspond to one FlexE cross-connected path. Each network node on the FlexE cross-connected path is configured with a slot allocated to the FlexE cross-connected path. An ingress network node on the FlexE cross-connected path may divide Ethernet frames included in the data flow into a plurality of data blocks, and outputs the data block to a next-hop network node on the FlexE cross-connected path in the slot allocated to the FlexE cross-connected path. When the data block arrives at an intermediate network node on the FlexE cross-connected path, the intermediate network node on the FlexE cross-connected path directly forwards, based on a mapping relationship between an inbound interface and an outbound interface of the intermediate network node and the slot allocated to the FlexE cross-connected path, the data block on the FlexE cross-connected path until an egress network node on the FlexE cross-connected path receives the data block. The egress network node restores the received data block to the Ethernet frames, and forms the data flow.

Because the intermediate network node on the FlexE cross-connected path does not need to restore the data block to the Ethernet frames, but directly forwards the data block, forwarding processing time can be reduced, an end-to-end forwarding delay can be shortened, and data forwarding efficiency can be improved. Therefore, to further improve data forwarding efficiency on the SRv6 network, the FlexE cross-connected path may be established on the SRv6 network. Specifically, the forwarding path may be established by the control node.

Currently, a process in which the control node establishes the forwarding path may be as follows. The control node determines, based on a service requirement of a service flow, each network node on the forwarding path and a slot that is on a FlexE interface of each network node and that serves the forwarding path. The control node sequentially configures the network nodes based on a sequence of the network nodes on the forwarding path. Specifically, the control node allocates, to the forwarding path, the determined slot that is on the FlexE interface of each network node and that serves the forwarding path. After the control node completes configuration on each network node, the forwarding path is established, and each network node on the forwarding path may forward the service flow by using the FlexE interface in the slot allocated by the control node to the forwarding path.

When there are a large quantity of network nodes on the forwarding path, the control node needs to configure all the network nodes on the forwarding path one by one. Consequently, a process of establishing the forwarding path is excessively complex.

SUMMARY

Embodiments of this application provide a method and an apparatus for establishing a forwarding path, and a computer-readable storage medium, to simplify a process of establishing a forwarding path. Technical solutions are as follows.

According to a first aspect, a method for establishing a forwarding path is provided. The method is applied to a first network node, where the method includes obtaining path information of a to-be-established forwarding path, where the path information includes an identifier of a network node on the forwarding path and a transmission resource requirement that needs to be allocated by the network node to the forwarding path, and sending a path establishment request packet based on the path information, where a packet header of the path establishment request packet includes the path information, and the path establishment request packet is used to trigger the network node to allocate a transmission resource to the forwarding path based on the transmission resource requirement.

In this method, the network node allocates the transmission resource to the forwarding path based on the path information in the path establishment request packet, to establish the forwarding path, and a control node does not need to configure each network node on the forwarding path, so that a process of establishing the forwarding path can be simplified.

In a possible implementation, the path information includes a segment identifier list. The segment identifier list includes a segment identifier (SID) of the network node, and an SID of one network node includes an identifier of the network node and a transmission resource requirement that needs to be allocated by the network node to the forwarding path.

In a possible implementation, the SID of the network node further includes an identifier of the forwarding path.

In a possible implementation, the identifier of the forwarding path is an SID of the forwarding path.

In a possible implementation, the transmission resource requirement includes a quantity of target slots or a target bandwidth, where the quantity of target slots is a quantity of slots required by the network node to forward a service flow, and the target bandwidth is a bandwidth required by the network node to forward the service flow.

In a possible implementation, the method further includes allocating a transmission resource to the forwarding path from a transmission resource of an outbound interface based on a transmission resource requirement included in an SID of the first network node in the segment identifier list, where the outbound interface is an outbound interface that is of the first network node and that is connected to a second network node, and the second network node is a next-hop network node of the first network node on the forwarding path.

Based on the foregoing possible implementations, the transmission resource of the outbound interface is allocated to the forwarding path, so that after the forwarding path is established, the first network node can output data on the forwarding path based on the transmission resource, of the outbound interface, allocated to the forwarding path.

In a possible implementation, the allocating a transmission resource to the forwarding path from a transmission resource of an outbound interface based on a transmission resource requirement included in an SID of the first network node in the segment identifier list includes allocating an outbound interface slot to the forwarding path from a slot of the outbound interface based on the transmission resource requirement included in the SID of the first network node.

In a possible implementation, after the allocating an outbound interface slot to the forwarding path from a slot of the outbound interface, the method further includes sending an inbound interface resource request message to the second network node, where the inbound interface resource request message indicates the second network node to allocate an inbound interface slot to the forwarding path based on the outbound interface slot allocated by the first network node to the forwarding path.

In a possible implementation, the allocating an outbound interface slot to the forwarding path from a slot of the outbound interface based on the transmission resource requirement included in the SID of the first network node in the segment identifier list includes determining a quantity of target slots based on the transmission resource requirement included in the SID of the first network node, where the quantity of target slots is a quantity of slots required by the network node to forward a service flow, and allocating outbound interface slots of the quantity of target slots to the forwarding path from the slot of the outbound interface.

In a possible implementation, after the allocating a transmission resource to the forwarding path from a transmission resource of an outbound interface based on a transmission resource requirement included in an SID of the first network node in the segment identifier list, the method further includes establishing a mapping relationship between the forwarding path and the transmission resource allocated by the first network node to the forwarding path.

Based on the foregoing possible implementations, when subsequently forwarding the data on the forwarding path, the first network node can quickly find, by using the established mapping relationship, the transmission resource allocated by the first network node to the forwarding path, so that the first network node can quickly forward the data on the forwarding path based on the transmission resource allocated by the first network node to the forwarding path.

In a possible implementation, the method further includes receiving a path establishment response packet sent by an egress network node on the forwarding path, where the path establishment response packet indicates that the forwarding path is established, or receiving a resource allocation complete response packet sent by each network node on the forwarding path, and determining, based on the resource allocation complete response packet sent by each network node on the forwarding path, that the forwarding path is successfully established.

In a possible implementation, the method further includes sending an identifier of the forwarding path and information corresponding to the forwarding path to another device on a network after determining that the forwarding path is successfully established.

Based on the foregoing possible implementations, the identifier of the forwarding path and the information corresponding to the forwarding path are sent to the another device, to notify the another forwarding device that the forwarding path is established, and the another device may also use data transmitted by using the forwarding path.

In a possible implementation, the another device includes the control node or a plurality of network nodes except the network node on the forwarding path.

In a possible implementation, the method further includes generating a path establishment failure response when the transmission resource fails to be allocated to the forwarding path, where the path establishment failure response indicates that the forwarding path fails to be established.

In a possible implementation, when a quantity of unallocated slots of the outbound interface of the first network node is less than the quantity of target slots, the transmission resource fails to be allocated to the forwarding path. The outbound interface is the outbound interface that is of the first network node and that is connected to the second network node, and the second network node is the next-hop network node of the first network node on the forwarding path.

In a possible implementation, before the obtaining path information corresponding to a to-be-established forwarding path, the method further includes sending available transmission resource information to another device on a network, where the available transmission resource information indicates an unallocated transmission resource on each interface of the first network node.

Based on the foregoing possible implementations, the another device may determine, based on the available transmission resource information of the first network node, whether the forwarding path can be established on the first network node.

In a possible implementation, the path establishment request packet includes a segment routing header (SRH), and the SRH carries the path information.

In a possible implementation, the path establishment request packet is a data packet or an internet control message protocol (ICMP) packet.

Based on the foregoing possible implementations, there is no need to define a new protocol for establishing the forwarding path on the network, and an existing protocol on the network may be reused to establish the forwarding path. For example, when the path establishment request packet is the data packet, the forwarding path may be established in a data transmission process.

In a possible implementation, the obtaining path information corresponding to a to-be-established forwarding path includes receiving the path information sent by the control node, determining the path information based on a service requirement of the service flow, or obtaining the path information from configuration information.

In a possible implementation, the method further includes receiving a path establishment failure response sent by the network node on the forwarding path, and sending a path withdrawal packet to the network node on the forwarding path.

The path establishment failure response indicates that the forwarding path fails to be established, and the path withdrawal packet indicates the network node on the forwarding path to withdraw the transmission resource allocated to the forwarding path.

In a possible implementation, a packet header of the path withdrawal packet carries the identifier of the forwarding path and a withdrawal identifier. The withdrawal identifier indicates the network node on the forwarding path to withdraw the transmission resource allocated to the forwarding path, or the path withdrawal packet is an ICMP packet.

According to a second aspect, a method for establishing a forwarding path is provided. The method is applied to a second network node, where the method includes receiving a path establishment request packet sent by a first network node, where a packet header of the path establishment request packet includes path information, and the path information includes an identifier of a network node on a forwarding path and a transmission resource requirement that needs to be allocated by the network node to the forwarding path, allocating a transmission resource to the forwarding path based on the path information, and sending the path establishment request packet.

In a possible implementation, the path information includes a segment identifier list. The segment identifier list includes a segment identifier (SID) of the network node, and an SID of one network node includes an identifier of the network node and a transmission resource requirement that needs to be allocated by the network node to the forwarding path.

In a possible implementation, the SID of the network node further includes an identifier of the forwarding path.

In a possible implementation, the identifier of the forwarding path is an SID of the forwarding path.

In a possible implementation, the transmission resource requirement includes a quantity of target slots or a target bandwidth, where the quantity of target slots is a quantity of slots required by the network node to forward a service flow, and the target bandwidth is a bandwidth required by the network node to forward the service flow.

In a possible implementation, the allocating a transmission resource to the forwarding path based on the path information includes allocating the transmission resource to the forwarding path from a transmission resource of an outbound interface based on a transmission resource requirement included in an SID of the second network node in the segment identifier list, where the outbound interface is an outbound interface that is of the second network node and that is connected to a third network node, and the third network node is a next-hop network node of the second network node on the forwarding path.

In a possible implementation, the allocating the transmission resource to the forwarding path from a transmission resource of an outbound interface based on a transmission resource requirement included in an SID of the second network node in the segment identifier list includes allocating an outbound interface slot to the forwarding path from a slot of the outbound interface based on the transmission resource requirement included in the SID of the second network node.

In a possible implementation, after the allocating an outbound interface slot to the forwarding path from a slot of the outbound interface, the method further includes sending an inbound interface resource request message to the third network node, where the inbound interface resource request message indicates the third network node to allocate an inbound interface slot to the forwarding path based on the outbound interface slot allocated by the second network node to the forwarding path.

In a possible implementation, the allocating an outbound interface slot to the forwarding path from a slot of the outbound interface based on the transmission resource requirement included in the SID of the second network node includes determining a quantity of target slots based on the transmission resource requirement included in the SID of the second network node, where the quantity of target slots is a quantity of slots required by the network node to forward a service flow, and allocating outbound interface slots of the quantity of target slots to the forwarding path from the slot of the outbound interface.

In a possible implementation, after the allocating a transmission resource to the forwarding path based on the path information, the method further includes establishing a mapping relationship between the forwarding path and the transmission resource allocated by the second network node to the forwarding path.

In a possible implementation, after the allocating a transmission resource to the forwarding path based on the path information, the method further includes sending a resource allocation complete response packet to an ingress network node on the forwarding path after the transmission resource is allocated to the forwarding path.

In a possible implementation, before the receiving a path establishment request packet sent by a first network node, the method further includes generating the SID corresponding to the second network node, where the SID includes a function field, and the function field identifies that the second network node can allocate the transmission resource to the service forwarding path.

In a possible implementation, the method further includes after the forwarding path is established, if a fault occurs on the second network node, sending fault information to an ingress network node on the forwarding path, where the fault information indicates that the fault occurs on the second network node.

In a possible implementation, the fault information is carried in an ICMP packet.

In a possible implementation, after the receiving a path establishment request packet, the method further includes sending a path establishment failure response to an ingress network node on the forwarding path when the transmission resource fails to be allocated to the forwarding path, where the path establishment failure response indicates that the forwarding path fails to be established.

In a possible implementation, when the quantity of target slots is greater than a total data amount of unallocated slots of the outbound interface of the second network node, an interface transmission resource fails to be allocated to the forwarding path. The outbound interface is the outbound interface that is of the second network node and that is connected to the third network node, and the third network node is the next-hop network node of the second network node on the forwarding path, or when the target bandwidth is less than an available bandwidth of the outbound interface of the second network node, the interface transmission resource fails to be allocated to the forwarding path.

In a possible implementation, before the receiving a path establishment request packet sent by a first network node, the method further includes sending available transmission resource information to another device on a network, where the available transmission resource information indicates an unallocated transmission resource on each interface of the second network node.

In a possible implementation, the path establishment request packet includes an SRH, and the SRH carries the path information.

In a possible implementation, the path establishment request packet is a data packet or an ICMP packet.

In a possible implementation, after the allocating a transmission resource to the forwarding path based on the path information, the method further includes receiving a path withdrawal packet, and deleting the mapping relationship between the forwarding path and the transmission resource allocated by the second network node to the forwarding path, where the path withdrawal packet indicates the network node on the forwarding path to withdraw the transmission resource allocated to the forwarding path.

In a possible implementation, a packet header of the path withdrawal packet carries the identifier of the forwarding path and a withdrawal identifier. The withdrawal identifier indicates the network node on the forwarding path to withdraw the transmission resource allocated to the forwarding path, or the path withdrawal packet is an ICMP packet.

According to a third aspect, an apparatus for establishing a forwarding path is provided, where the apparatus is a first network node, and the apparatus includes an obtaining module, configured to obtain path information of a to-be-established forwarding path, where the path information includes an identifier of a network node on the forwarding path and a transmission resource requirement that needs to be allocated by the network node to the forwarding path, and a sending module, configured to send a path establishment request packet based on the path information, where a packet header of the path establishment request packet includes the path information, and the path establishment request packet is used to trigger the network node to allocate a transmission resource to the forwarding path based on the transmission resource requirement.

In a possible implementation, the path information includes a segment identifier list. The segment identifier list includes a segment identifier (SID) of the network node, and an SID of one network node includes an identifier of the network node and a transmission resource requirement that needs to be allocated by the network node to the forwarding path.

In a possible implementation, the SID of the network node further includes an identifier of the forwarding path.

In a possible implementation, the identifier of the forwarding path is an SID of the forwarding path.

In a possible implementation, the transmission resource requirement includes a quantity of target slots or a target bandwidth, where the quantity of target slots is a quantity of slots required by the network node to forward a service flow, and the target bandwidth is a bandwidth required by the network node to forward the service flow.

In a possible implementation, the apparatus further includes an allocation module, configured to allocate the transmission resource to the forwarding path from a transmission resource of an outbound interface based on a transmission resource requirement included in an SID of the first network node in the segment identifier list, where the outbound interface is an outbound interface that is of the first network node and that is connected to a second network node, and the second network node is a next-hop network node of the first network node on the forwarding path.

In a possible implementation, the allocation module is configured to allocate an outbound interface slot to the forwarding path from a slot of the outbound interface based on the transmission resource requirement included in the SID of the first network node.

In a possible implementation, the sending module is further configured to send an inbound interface resource request message to the second network node, where the inbound interface resource request message indicates the second network node to allocate an inbound interface slot to the forwarding path based on the outbound interface slot allocated by the first network node to the forwarding path.

In a possible implementation, the allocation module is configured to determine a quantity of target slots based on the transmission resource requirement included in the SID of the first network node, where the quantity of target slots is a quantity of slots required by the network node to forward a service flow, and allocate outbound interface slots of the quantity of target slots to the forwarding path from the slot of the outbound interface.

In a possible implementation, the apparatus further includes an establishment module, configured to establish a mapping relationship between the forwarding path and the transmission resource allocated by the first network node to the forwarding path.

In a possible implementation, the obtaining module is further configured to receive a path establishment response packet sent by an egress network node on the forwarding path, where the path establishment response packet indicates that the forwarding path is established, or receive a resource allocation complete response packet sent by each network node on the forwarding path, and determine, based on the resource allocation complete response packet sent by each network node on the forwarding path, that the forwarding path is successfully established.

In a possible implementation, the sending module is further configured to send an identifier of the forwarding path and information corresponding to the forwarding path to another device on a network after it is determined that the forwarding path is successfully established.

In a possible implementation, the another device includes a control node or a plurality of network nodes except the network node on the forwarding path.

In a possible implementation, the apparatus further includes a generation module, configured to generate a path establishment failure response when the transmission resource fails to be allocated to the forwarding path, where the path establishment failure response indicates that the forwarding path fails to be established.

In a possible implementation, when a quantity of unallocated slots of the outbound interface of the first network node is less than the quantity of target slots, the transmission resource fails to be allocated to the forwarding path. The outbound interface is the outbound interface that is of the first network node and that is connected to the second network node, and the second network node is the next-hop network node of the first network node on the forwarding path.

In a possible implementation, the sending module is further configured to send available transmission resource information to another device on a network, where the available transmission resource information indicates an unallocated transmission resource on each interface of the first network node.

In a possible implementation, the path establishment request packet includes a segment routing header (SRH), and the SRH carries the path information.

In a possible implementation, the path establishment request packet is a data packet or an internet control message protocol (ICMP) packet.

In a possible implementation, the obtaining module is configured to receive the path information sent by the control node, determine the path information based on a service requirement of the service flow, or obtain the path information from configuration information.

In a possible implementation, the obtaining module is further configured to receive the path establishment failure response sent by the network node on the forwarding path, and send a path withdrawal packet to the network node on the forwarding path.

The path establishment failure response indicates that the forwarding path fails to be established, and the path withdrawal packet indicates the network node on the forwarding path to withdraw the transmission resource allocated to the forwarding path.

In a possible implementation, a packet header of the path withdrawal packet carries the identifier of the forwarding path and a withdrawal identifier. The withdrawal identifier indicates the network node on the forwarding path to withdraw the transmission resource allocated to the forwarding path, or the path withdrawal packet is an ICMP packet.

According to a fourth aspect, an apparatus for establishing a forwarding path is provided, where the apparatus is a second network node, and the apparatus includes a receiving module, configured to receive a path establishment request packet sent by a first network node, where a packet header of the path establishment request packet includes path information, and the path information includes an identifier of a network node on a forwarding path and a transmission resource requirement that needs to be allocated by the network node to the forwarding path, an allocation module, configured to allocate a transmission resource to the forwarding path based on the path information, and a sending module, configured to send the path establishment request packet.

In a possible implementation, the path information includes a segment identifier list. The segment identifier list includes a segment identifier (SID) of the network node, and an SID of one network node includes an identifier of the network node and a transmission resource requirement that needs to be allocated by the network node to the forwarding path.

In a possible implementation, the SID of the network node further includes an identifier of the forwarding path.

In a possible implementation, the identifier of the forwarding path is an SID of the forwarding path.

In a possible implementation, the transmission resource requirement includes a quantity of target slots or a target bandwidth, where the quantity of target slots is a quantity of slots required by the network node to forward a service flow, and the target bandwidth is a bandwidth required by the network node to forward the service flow.

In a possible implementation, the allocation module is configured to allocate the transmission resource to the forwarding path from a transmission resource of an outbound interface based on a transmission resource requirement included in an SID of the second network node in the segment identifier list, where the outbound interface is an outbound interface that is of the second network node and that is connected to a third network node, and the third network node is a next-hop network node of the second network node on the forwarding path.

In a possible implementation, the allocation module is configured to allocate an outbound interface slot to the forwarding path from a slot of the outbound interface based on the transmission resource requirement included in the SID of the second network node.

In a possible implementation, the sending module is further configured to send an inbound interface resource request message to the third network node, where the inbound interface resource request message indicates the third network node to allocate an inbound interface slot to the forwarding path based on the outbound interface slot allocated by the second network node to the forwarding path.

In a possible implementation, the allocation module is configured to determine a quantity of target slots based on the transmission resource requirement included in the SID of the second network node, where the quantity of target slots is a quantity of slots required by the network node to forward a service flow, and allocate outbound interface slots of the quantity of target slots to the forwarding path from the slot of the outbound interface.

In a possible implementation, the apparatus further includes an establishment module, configured to establish a mapping relationship between the forwarding path and the transmission resource allocated by the second network node to the forwarding path.

In a possible implementation, the sending module is further configured to send a resource allocation complete response packet to an ingress network node on the forwarding path after the transmission resource is allocated to the forwarding path.

In a possible implementation, the apparatus further includes a generation module, configured to generate the SID corresponding to the second network node, where the SID includes a function field, and the function field identifies that the second network node can allocate the transmission resource to the service forwarding path.

In a possible implementation, the sending module is further configured to after the forwarding path is established, if a fault occurs on the second network node, send fault information to an ingress network node on the forwarding path, where the fault information indicates that the fault occurs on the second network node.

In a possible implementation, the fault information is carried in an ICMP packet.

In a possible implementation, the sending module is further configured to send a path establishment failure response to an ingress network node on the forwarding path when the transmission resource fails to be allocated to the forwarding path, where the path establishment failure response indicates that the forwarding path fails to be established.

In a possible implementation, when the quantity of target slots is greater than a total data amount of unallocated slots of the outbound interface of the second network node, an interface transmission resource fails to be allocated to the forwarding path. The outbound interface is the outbound interface that is of the second network node and that is connected to the third network node, and the third network node is the next-hop network node of the second network node on the forwarding path, or when the target bandwidth is less than an available bandwidth of the outbound interface of the second network node, the interface transmission resource fails to be allocated to the forwarding path.

In a possible implementation, the sending module is further configured to send available transmission resource information to another device on a network, where the available transmission resource information indicates an unallocated transmission resource on each interface of the second network node.

In a possible implementation, the path establishment request packet includes an SRH, and the SRH carries the path information.

In a possible implementation, the path establishment request packet is a data packet or an ICMP packet.

In a possible implementation, the apparatus further includes a deletion module.

The receiving module is further configured to receive a path withdrawal packet, where the path withdrawal packet indicates the network node on the forwarding path to withdraw the transmission resource allocated to the forwarding path.

The deletion module is configured to delete the mapping relationship between the forwarding path and the transmission resource allocated by the second network node to the forwarding path.

In a possible implementation, a packet header of the path withdrawal packet carries the identifier of the forwarding path and a withdrawal identifier. The withdrawal identifier indicates the network node on the forwarding path to withdraw the transmission resource allocated to the forwarding path, or the path withdrawal packet is an ICMP packet.

According to a fifth aspect, a network node is provided. The network node includes a processor and a memory. The memory stores at least one instruction, and the instruction is loaded and executed by the processor to implement the operations performed in the foregoing methods for establishing a forwarding path.

According to a sixth aspect, a computer-readable storage medium is provided. The storage medium stores at least one instruction, and the instruction is loaded and executed by a processor to implement the operations performed in the foregoing methods for establishing a forwarding path.

BRIEF DESCRIPTION OF THE DRAWINGS

FIG. 5 is a schematic diagram of a structure of an SID of a network node according to an embodiment of this application;

FIG. 6 is a schematic diagram of an extended type-length-value (TLV) according to an embodiment of this application;

DETAILED DESCRIPTION OF ILLUSTRATIVE EMBODIMENTS

To make the objectives, technical solutions, and advantages of this application clearer, the following further describes implementations of this application in detail with reference to accompanying drawings.

To facilitate understanding of an implementation process of embodiments of this application, a FlexE technology is first described as follows.

Figure 1:
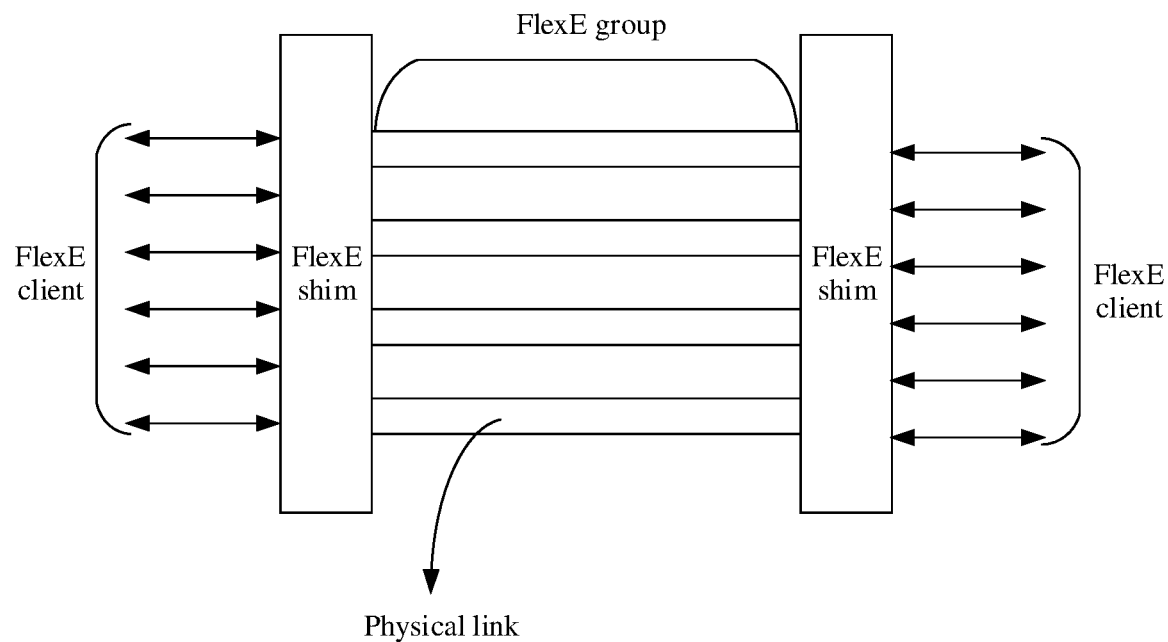
FIG. 1 is a schematic diagram of an architecture of an Ethernet according to an embodiment of this application.

The FlexE technology is an interface technology that is based on an Ethernet interface and that implements decoupling between an Ethernet media access control (MAC) layer and an Ethernet physical layer (PHY) by introducing a FlexE shim. A flexible Ethernet is based on a client/group architecture, and may support mapping and transmission of any plurality of different sub-interfaces on any group of PHY interfaces. For example, FIG. 1 is a schematic diagram of an architecture of an Ethernet according to an embodiment of this application. The architecture of the Ethernet includes a flex Ethernet group (FlexE Group), a FlexE shim, and a plurality of flex Ethernet clients (FlexE Clients). The FlexE group includes at least one physical link, in other words, at least one physical link may be bound as one FlexE group. The FlexE shim may implement mapping, bearing, and bandwidth allocation of service flows of the plurality of FlexE clients in the FlexE group by using a calendar mechanism. The FlexE shim may divide each physical link in the FlexE group into data bearer channels of a plurality of slots (Slots). Transmission bandwidths of the data bearer channels of all the slots are the same. A group of slots corresponding to each physical link may be used as a calendar of the physical link. A FlexE client is a user interface for any service, and can be considered as a sub-interface.

A data packet on an SRv6 network is described as follows. The data packet may include an IPv6 header, an SRH, and a payload. The IPv6 header is used to store a source address and a destination address of the data packet. The SRH may include an SID list, a segment left (SL), a route type, a flag, an optional type-length-value (TLV), and the like. A type value of the route type is a fixed value, and the fixed value indicates a routing protocol. The SID list includes a plurality of SIDs. A plurality of network nodes indicated by the plurality of SIDs may form one forwarding path. The plurality of SIDs are arranged in the SID list in a reverse order of locations of the network nodes on the forwarding path. For example, if a forwarding path 1 is a node 1→a node 2→a node 3, and SIDs of the node 1 to the node 3 are respectively SID1 to SID3, an SID list corresponding to the forwarding path 1 is SID3, SID2, and SID1. The SL is used to record a quantity of network nodes that the data packet further needs to pass through to reach an egress network node on the forwarding path. The egress network node on the forwarding path is a network node indicated by the first SID in the SID list, namely, the last network node on the forwarding path.

On the SRv6 network, an SID is an identifier that uses an IPv6 address format and that is allocated to a network node, and the SID may include a locator field, a function field, and an optional arguments field. The locator field is used to store an identifier of the network node, for example, an addressable route prefix of the network node. The function part is used to store a function operation indicated by the SID, for example, forwards a packet after querying a specified forwarding table. The arguments field is used to store an argument required for performing the function operation indicated by the function part.

Figure 2:
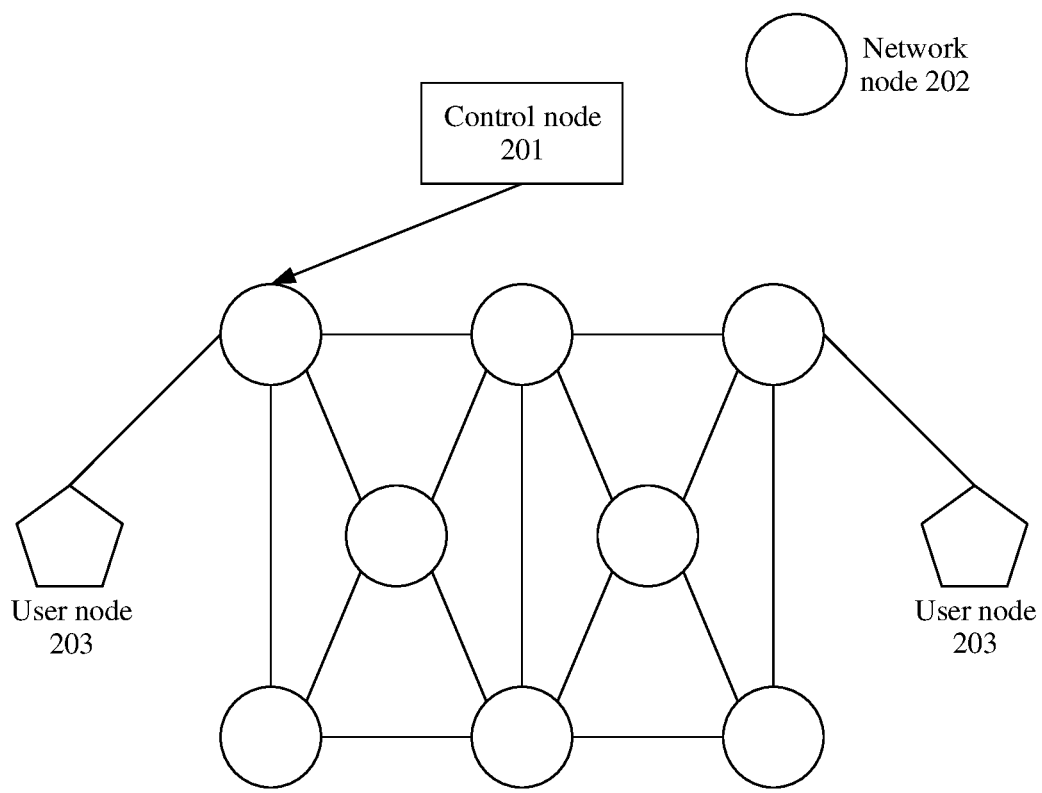
FIG. 2 is a schematic diagram of a data transmission system according to an embodiment of this application.

FIG. 2 is a schematic diagram of a data transmission system according to an embodiment of this application. Refer to FIG. 2. The data transmission system 200 includes a control node 201 and a plurality of network nodes 202. The data transmission system 200 may support an SRv6 technology, and the data transmission system 200 uses a connection-oriented data transmission technology, for example, a FlexE technology or an optical transport network (OTN) technology, on a forwarding plane.

The control node 201 may determine, based on a service requirement of a service flow, a forwarding path of the service flow and a transmission resource requirement required by each network node on the forwarding path to forward the service flow. Transmission resource requirements required by all the network nodes on the forwarding path to forward the service flow may be the same or may be different. The transmission resource requirement required by each network node to forward the service flow is a transmission resource requirement that needs to be allocated by the network node to the forwarding path. The control node 201 may further deliver path information including the determined forwarding path and the transmission resource requirements to an ingress network node on the forwarding path, and the ingress network node on the forwarding path establishes the forwarding path. The ingress network node on the forwarding path is the first network node on the forwarding path. The control node 201 may be a computing device such as a notebook computer, a computer, or a server. The control node 201 is not specifically limited in this embodiment of this application.

Each network node 202 in the data transmission system 200 may support the FlexE technology, and the plurality of network nodes 202 may include a plurality of edge network nodes and a plurality of intermediate network nodes. The edge network node is a device connected to a user side, and may receive a service flow sent by the user side. The ingress network node on the forwarding path of the service flow may be an edge network node, and the egress network node on the forwarding path may also be an edge network node. The intermediate network node on the forwarding path may be an intermediate network node in the plurality of network nodes 202, and the intermediate network node is a network node except the ingress network node and the egress network node on the forwarding path. The edge network node may be a provider edge router (PE), or may be a network device such as a switch. The intermediate network node may be a provider router (P), or may be referred to as a P node.

A process of establishing the forwarding path in the data transmission system 200 may be as follows. For the to-be-established forwarding path, the ingress network node on the forwarding path may receive the path information sent by the control node 201, and send a path establishment request packet that carries the path information to a next-hop network node of the ingress network node on the forwarding path. In addition, the ingress network node may further allocate a transmission resource to the forwarding path based on the transmission resource requirement in the path information. For any intermediate network node on the forwarding path, if the intermediate network node receives the path establishment request packet, the intermediate network node allocates a transmission resource to the forwarding path based on the transmission resource requirement carried in the path establishment request packet, send the path establishment request packet to a next-hop network node of the intermediate network node on the forwarding path, until the path establishment request packet reaches the egress network node on the forwarding path. After the egress network node also allocates a transmission resource to the forwarding path, the egress network node may send a path establishment response packet to the ingress network node on the forwarding path, to indicate that the forwarding path is established. If any network node on the forwarding path does not have sufficient transmission resources that can be allocated to the forwarding path, the network node reports a path establishment failure response to the ingress network node, to indicate that establishment of the forwarding path fails. It should be noted that, in addition to obtaining the path information from the control node, the ingress network node on the forwarding path may further determine the path information of the forwarding path based on the service requirement of the service flow. Any network node 202 may be a network device such as a router or a switch. The network node 202 is not specifically limited in this embodiment of this application.

The data transmission system 200 may further include a user node 203. The user node 203 is a device for forwarding the service flow on the user side. The user node 203 is configured to send the service flow to the edge network node (the ingress network node on the forwarding path), and may be further configured to receive the service flow sent by the edge network node (the egress network node on the forwarding path). The user node 203 may be a customer edge router (CE), or may be a network device such as a switch. The user node 203 is not specifically limited in this embodiment of this application.

Figure 3:
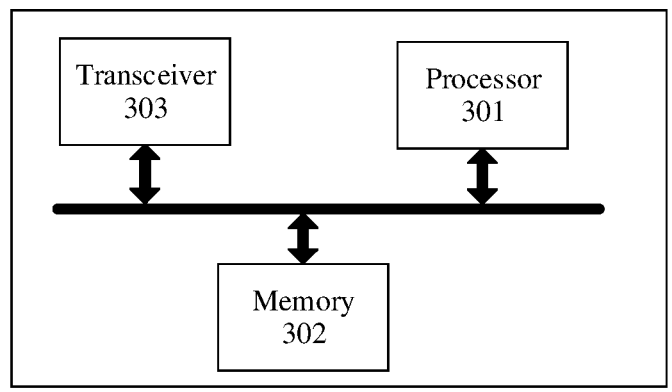
FIG. 3 is a schematic diagram of a structure of a network node according to an embodiment of this application.

FIG. 3 is a schematic diagram of a structure of a network node according to an embodiment of this application. The network node 300 may vary greatly due to different configurations or performance, and may include one or more processors (central processing units, CPUs) 301 and one or more memories 302. The memory 302 stores at least one instruction, and the at least one instruction is loaded and executed by the processor 301 to implement methods provided in the following method embodiments. The network node 300 may further include a transceiver 303, configured to receive a packet, data information, or the like. The transceiver 303 may be an Ethernet interface, a fast Ethernet (FE) interface, a gigabit Ethernet (GE) interface, or the like. Certainly, the network node 300 may further have components such as a wired or wireless network interface, a keyboard, and an input/output interface, to perform input and output. The network node 300 may further include another component configured to implement a device function. Details are not described herein.

In an example embodiment, a computer-readable storage medium is further provided, for example, a memory including instructions. The instructions may be executed by a processor in a terminal to complete a method for establishing a forwarding path in the following embodiments. For example, the computer-readable storage medium may be a read-only memory (ROM), a random access memory (RAM), a compact disc read-only memory, a compact disc read-only memory (CD-ROM), a magnetic tape, a floppy disk, an optical data storage device, or the like.

Figure 4:
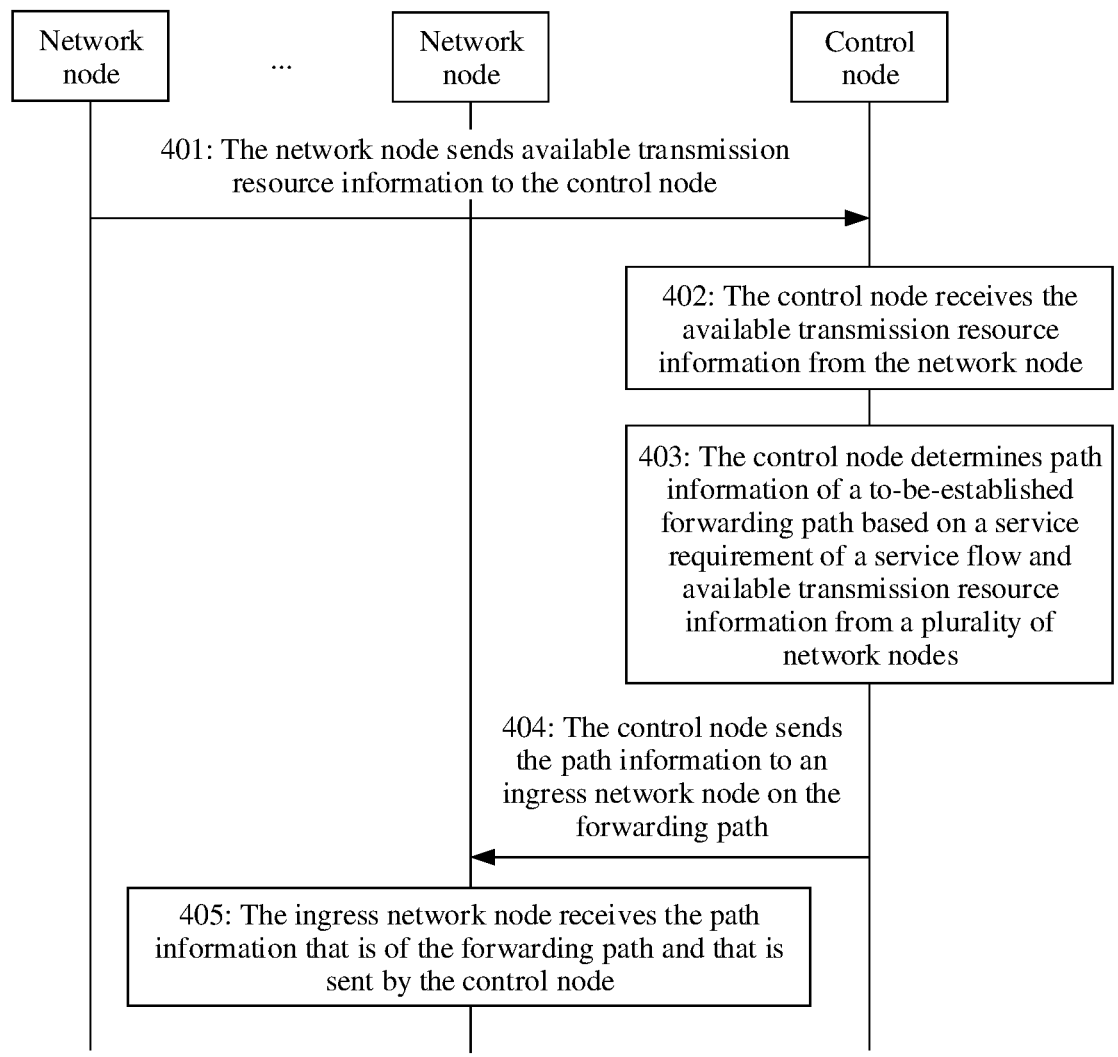
FIG. 4 is a flowchart of a path information obtaining method according to an embodiment of this application.

A network node in a data transmission system may obtain path information of a to-be-established forwarding path from a control node, and generate a path establishment request packet based on the path information, to establish the forwarding path. To further describe a process in which the network node obtains the path information from the control node, FIG. 4 is a flowchart of a path information obtaining method according to an embodiment of this application. A procedure of the method may include the following steps 401 to 405.

401: A network node sends available transmission resource information to a control node, where the available transmission resource information indicates an unallocated transmission resource of each interface of the network node.

The network node is any network node in a data transmission system. A transmission resource of an interface may be a transmission bandwidth of the interface or a slot resource of the interface. A transmission resource of an interface may include a total transmission bandwidth of the interface or a total quantity of slots of the interface. A relationship between the total transmission bandwidth and the total quantity of slots is the total transmission bandwidth is a product of a transmission bandwidth corresponding to a single slot and the total quantity of slots. An unallocated transmission resource of an interface is a transmission resource that is of the interface and that is not allocated to a forwarding path, namely, a remaining transmission resource of the interface, or an available transmission resource of the interface. Available transmission resource information of a network node may be a quantity of unallocated slots on each interface of the network node or a currently available transmission bandwidth of each interface. It should be noted that each network node in the data transmission system may perform step 401.

In a possible implementation, the network node may further send the available transmission resource information of the network node to another network node on the data transmission system, and then the another network node sends the available transmission resource information of the network node to the control node.

402: The control node receives the available transmission resource information from the network node.

Each network node in the data transmission system may perform step 401, so that the control node can receive available transmission resource information of each network node in the data transmission system.

403: The control node determines path information of a to-be-established forwarding path based on a service requirement of a service flow and the available transmission resource information from the plurality of network nodes, where the path information includes identifiers of network nodes on the forwarding path and a transmission resource requirement that is on the forwarding path and that needs to be allocated by the network nodes to the forwarding path.

The service flow is any service flow to be transmitted in the data transmission system. The service requirement may include an ingress network node on the to-be-established forwarding path, an egress network node on the forwarding path, and the transmission resource requirement required by the network node to forward the service flow. The forwarding path is used to transmit the service flow, and the ingress network node may be the first edge network node that receives the service flow from a user side in the data transmission system. The egress network node may be an edge network node that sends the service flow to another user side in the data transmission system.

The transmission resource requirement may include a quantity of target slots or a target bandwidth. The quantity of target slots is a quantity of slots required by the network node to forward the service flow, and the target bandwidth is a bandwidth required by the network node to forward the service flow. A relationship between the quantity of target slots and the transmission bandwidth of the service flow is as follows. The quantity of target slots is greater than or equal to the transmission bandwidth of the service flow divided by a transmission bandwidth corresponding to a single slot.

The path information may include a segment identifier list. The segment identifier list may include an SID of the network node on the forwarding path. An SID of one network node includes an identifier of the network node and a transmission resource requirement that needs to be allocated by the network node to the forwarding path. The network node on the forwarding path may be all network nodes on the forwarding path, or may be a part of network nodes on the forwarding path.

The path information may further include an identifier of the forwarding path. For example, the SID of the network node may further include the identifier of the forwarding path. The identifier of the forwarding path indicates the forwarding path. The identifier of the forwarding path may be an identity (ID) number of the forwarding path, and the identifier of the forwarding path may alternatively be represented by an SID of an SRv6. A new SID may be defined to specially indicate the forwarding path. The SID that indicates the forwarding path may be referred to as a path SID, and the path SID is the identifier of the forwarding path. Certainly, the identifier of the forwarding path may alternatively be represented in another form. A manner of representing the identifier of the forwarding path is not specifically limited in this embodiment of this application. The path information may further include an outbound interface identifier of at least one network node on the forwarding path. The at least one network node may include the ingress network node and an intermediate network node on the forwarding path. An outbound interface identifier of one network node indicates an outbound interface of the network node, and the outbound interface is an outbound interface, on the network node, that is expected to be used to establish the forwarding path.

The control node may determine the path information based on the ingress network node, the egress network node, the transmission resource requirement, and the available transmission resource information of the plurality of network nodes. In a possible implementation, the process shown in step 403 may be implemented by using the following steps 4031 to 4033.

Step 4031: The control node may determine the quantity of target slots based on the transmission resource requirement.

When the transmission resource requirement includes the quantity of target slots, the control node may directly obtain the quantity of target slots from the transmission resource requirement. When the transmission resource requirement includes the target bandwidth, the control node may determine the quantity of target slots based on the target bandwidth and the transmission bandwidth corresponding to the single slot.

In a possible implementation, the control node calculates a quotient of the target bandwidth and the transmission bandwidth corresponding to the single slot. If the quotient is an integer, the control node uses the quotient as the quantity of target slots, otherwise, the quantity of target slots is a sum of the quotient and 1.

Step 4032: The control node determines the intermediate network node on the forwarding path from the plurality of network nodes based on the quantity of target slots, the available transmission resource information of the plurality of network nodes, and the ingress network node and the egress network node on the forwarding path.

The control node may determine a plurality of target forwarding paths between the ingress network node and the egress network node based on the ingress network node and the egress network node, and form the forwarding path by using any one of the plurality of target forwarding paths, the ingress network node, and the egress network node.

Alternatively, for any network node on any target forwarding path of the plurality of target forwarding paths, when a quantity of unallocated slots indicated by available transmission resource information of the network node is less than or equal to the quantity of target slots, or when an available transmission bandwidth indicated by the available transmission resource information of the network node is less than or equal to the target bandwidth, it indicates that transmission resources of all network nodes on the target forwarding path are sufficient. In this case, the control node may use each network node on the target forwarding path as the intermediate network node on the forwarding path, in other words, the target forwarding path, the ingress network node, and the egress network node form the forwarding path.

In a possible implementation, the service requirement may further include a transmission delay of the service flow. When determining the intermediate network node on the forwarding path, the control node may further determine the intermediate network node on the forwarding path from the plurality of network nodes based on the transmission delay of the service flow and the quantity of target slots, so that transmission duration of the service flow on the forwarding path is less than or equal to the transmission delay of the service flow. Certainly, to reduce workload of the control node, when determining the intermediate network node on the forwarding path, the control node may alternatively consider only the transmission delay of the service flow without considering the quantity of target slots. A process in which the control node determines the intermediate network node on the forwarding path is not specifically limited in this embodiment of this application.

Step 4033: The control node determines the path information of the forwarding path based on the ingress network node, the intermediate network node, and the egress network node on the forwarding path.

The control node may combine the identifier of the forwarding path, the identifier of the network node on the forwarding path, an outbound interface identifier of the ingress network node, an outbound interface identifier of the intermediate network node, and the transmission resource requirement into the path information.

The path information may include the SID of the network node on the forwarding path. The control node may use a connection establishment (connection establishment) SID to indicate to establish a connection on a specified interface for the forwarding path. The connection establishment SID may be a variant of an End.X SID on an SRv6 network, and the variant may be denoted as an End.XE SID. The End.XE SID is an SID type used to establish the forwarding path. Therefore, the path information may be represented by a connection establishment SID of each network node on the forwarding path, so that the path information may include the identifier of the forwarding path, the identifier of the network node on the forwarding path, the outbound interface identifier of the at least one network node on the forwarding path, and the transmission resource requirement.

Any network node on the forwarding path may have one connection establishment SID, and a locator field of the connection establishment SID is used to carry the identifier of the network node. A function field of the connection establishment SID is used to carry the outbound interface identifier of the network node, to indicate to perform a related function operation on an outbound interface indicated by the outbound interface identifier. The function field is further used to carry an operation identifier, and different operation identifiers indicate different function operations. The operation identifier may include a first operation identifier, a second operation identifier, a third operation identifier, a fourth operation identifier, and a fifth operation identifier. The first operation identifier indicates to establish the forwarding path, that is, indicates to allocate the transmission resource to the forwarding path from the outbound interface and an inbound interface connected to the outbound interface. The second operation identifier indicates to feed back that the path is successfully established. The third operation identifier indicates to feed back that the path fails to be established. The fourth operation identifier indicates to delete the forwarding path. The fifth operation identifier indicates to transfer a message by using an internet control message protocol (internet control message protocol, ICMP) packet. The different operation identifiers have different representation manners. For example, FIG. 5 is a schematic diagram of a structure of an SID of a network node according to an embodiment of this application. A network node A1 is used as an example. The first field of SID1 (A1::A102:1001:YXXX) in FIG. 5 is a locator field, and "A1" in the field is an identifier of the network node A1. The second field of SID1 is a function field, "A" in the field is a first operation identifier, and "102" in the field indicates that an interface 102 of the network node A1 is an outbound interface, on the network node A1, of a forwarding path 1001. In this case, the second field indicates to allocate a transmission resource to the forwarding path 1001 on the interface 102 of the network node A1 and an inbound interface connected to the interface 102. If the second field carries a second operation identifier B, it indicates to feed back that the path is successfully established. If the second field carries a third operation identifier C, it indicates to feed back that the path fails to be established. If the second field carries a fourth operation identifier D, it indicates to delete the forwarding path. If the second field carries a fifth operation identifier E, it indicates to transfer a message by using an ICMP packet. It should be noted that, if the path information does not include an outbound interface identifier of each network node, the locator field of the SID may carry only the operation identifier, and does not carry the outbound interface identifier of the network node.

An arguments field of the connection establishment SID may include an identifier field and a resource parameter field of the forwarding path, that is, both parameters in the identifier field and the resource parameter field of the forwarding path are parameters in the arguments field. The identifier field of the forwarding path is used to carry the identifier of the forwarding path. The resource parameter field is used to carry the transmission resource requirement. The resource parameter field may be further used to carry an identifier of a FlexE client corresponding to the forwarding path. For example, in SID2 (A1::102:1001:YXXX:A) in FIG. 5, the third field in SID2 is the identifier field of the forwarding path, and "1001" in the field is the identifier of the forwarding path. The fourth field in SID2 is the resource parameter field. In this field, Y being 0 indicates that "XXX" in this field is the identifier of the FlexE client, Y being 1 indicates that "XXX" is the transmission resource requirement, Y being 2 indicates that "XXX" is an error code, and Y being 3 is not defined currently. A related function can be defined based on the service requirement.

In a possible implementation, the function field of the connection establishment SID may further carry only the outbound interface identifier but not the operation identifier. The arguments field of the connection establishment SID may further include an operation identifier field, where the operation identifier field is used to carry the operation identifier. It may be understood that, when the function field of the connection establishment SID carries only the outbound interface identifier but not the operation identifier, the connection establishment SID may include the operation identifier field, and the operation identifier is carried in the operation identifier field. In this case, the function field indicates to perform an operation related to the connection establishment on a specified interface. Specific operation content of the related operation is indicated by the operation identifier in the operation identifier field. For example, the function field of SID2 in FIG. 5 carries only the outbound interface identifier 102, it indicates that the operation related to the connection establishment is performed on the interface 102. The fifth field in SID2 is the operation identifier field, and the operation identifier field carries the first operation identifier A. When the function field of the connection establishment SID carries the operation identifier, the arguments field of the connection establishment SID may not include the operation identifier field, for example, SID1 in FIG. 5.

It should be noted that the identifier field, the operation identifier field, and the resource parameter field of the forwarding path are all arguments fields of the function field. For different types of function operations, content carried in the arguments field may be different. For example, for a function operation of establishing the forwarding path, a corresponding resource parameter field carries the transmission resource requirement, but does not carry the error code. In conclusion, content carried in the identifier field, the operation identifier field, and the resource parameter field of the forwarding path is all parameters required for a function operation indicated by the function field. In addition, in some embodiments, the resource parameter field may alternatively not carry the identifier of the FlexE client. In addition, a sequence of fields in the arguments field of the connection establishment SID is not specifically limited in this embodiment of this application. For example, the operation identifier field may be the first field in the arguments field, or may be the last field in the arguments field.

It should be noted that a reply SID may be allocated to the egress network node on the forwarding path. The reply SID may be denoted as an End.R SID, and the reply SID indicates the egress network node to send a path establishment response packet to the ingress network node on the forwarding path, to notify the ingress network node that the forwarding path is established.

It should be noted that in a process of determining the path information, the control node may alternatively determine the path information based on only available transmission resource information of the ingress network node, the egress network node, and the plurality of network nodes, without considering the transmission resource requirement. In a possible implementation, the control node determines the plurality of target forwarding paths between the ingress network node and the egress network node based on the ingress network node and the egress network node. If an available transmission resource indicated by available transmission resource information of each intermediate network node on any target forwarding path meets a preset transmission resource requirement, the control node may use any target forwarding path as the forwarding path, generates path information that includes only the identifier of the forwarding path, the identifier of the network node on the forwarding path, the outbound interface identifier of the ingress network node, and the transmission resource requirement. The process shown in step 403 is a process in which the control node determines the path information of the to-be-established forwarding path based on the service requirement of the service flow.

404: The control node sends the path information to the ingress network node on the forwarding path.

The data transmission system may support a segment routing policy (SR-Policy) mechanism. The control node may send an SR-Policy that carries the path information to the ingress network node. The forwarding path may be a forwarding path indicated by an SID list having the highest weight in an active candidate path (active CP) in the SR-Policy. To enable the SR-Policy to indicate to establish the forwarding path, the control node may extend an existing type-length-value (tag-length-value, TLV) of the SR-Policy, and a path type field, a path identifier (path ID) field, and a resource requirement field may be newly added to the TLV. The path type field is used to store an identifier for indicating to establish the forwarding path or delete the forwarding path, so that the ingress network node establishes the forwarding path or deletes the forwarding path based on the identifier in the path type field. The path identifier field is used to store the identifier of the forwarding path. A format of a segment list in the SR-Policy may be reused for the path identifier field. The resource requirement field is used to store the transmission resource requirement of the service flow. A reserved field may be further added to the TLV, and the reserved field is not defined currently and can be defined based on the service requirement. A newly added field in a TLV in FIG. 6 is used as an example. FIG. 6 is a schematic diagram of the extended TLV according to an embodiment of this application.

405: The ingress network node receives the path information that is of the forwarding path and that is sent by the control node.

Figure 7A:
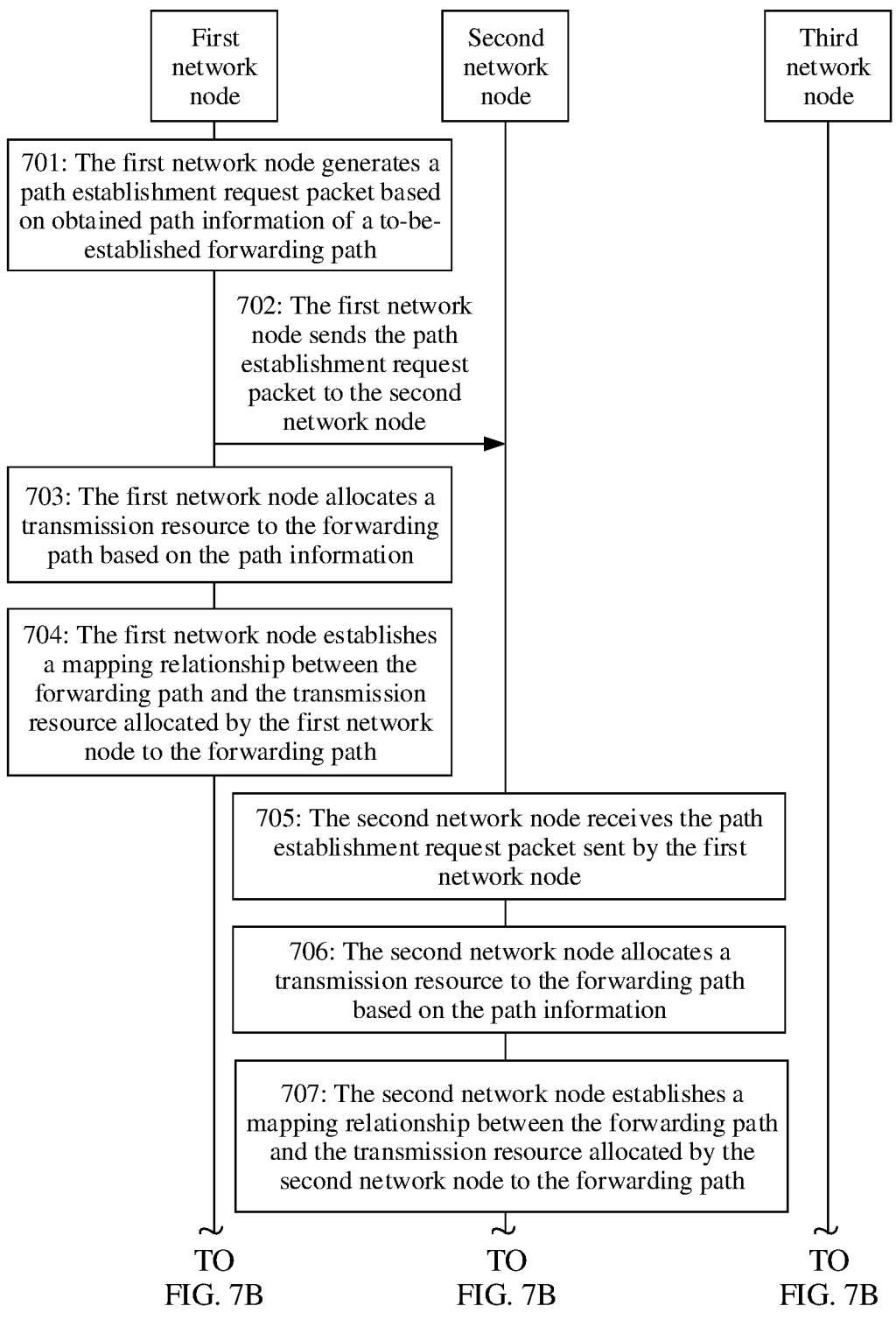
FIG. 7A and FIG. 7B are a flowchart of a method for establishing a forwarding path according to an embodiment of this application.
Figure 7B:
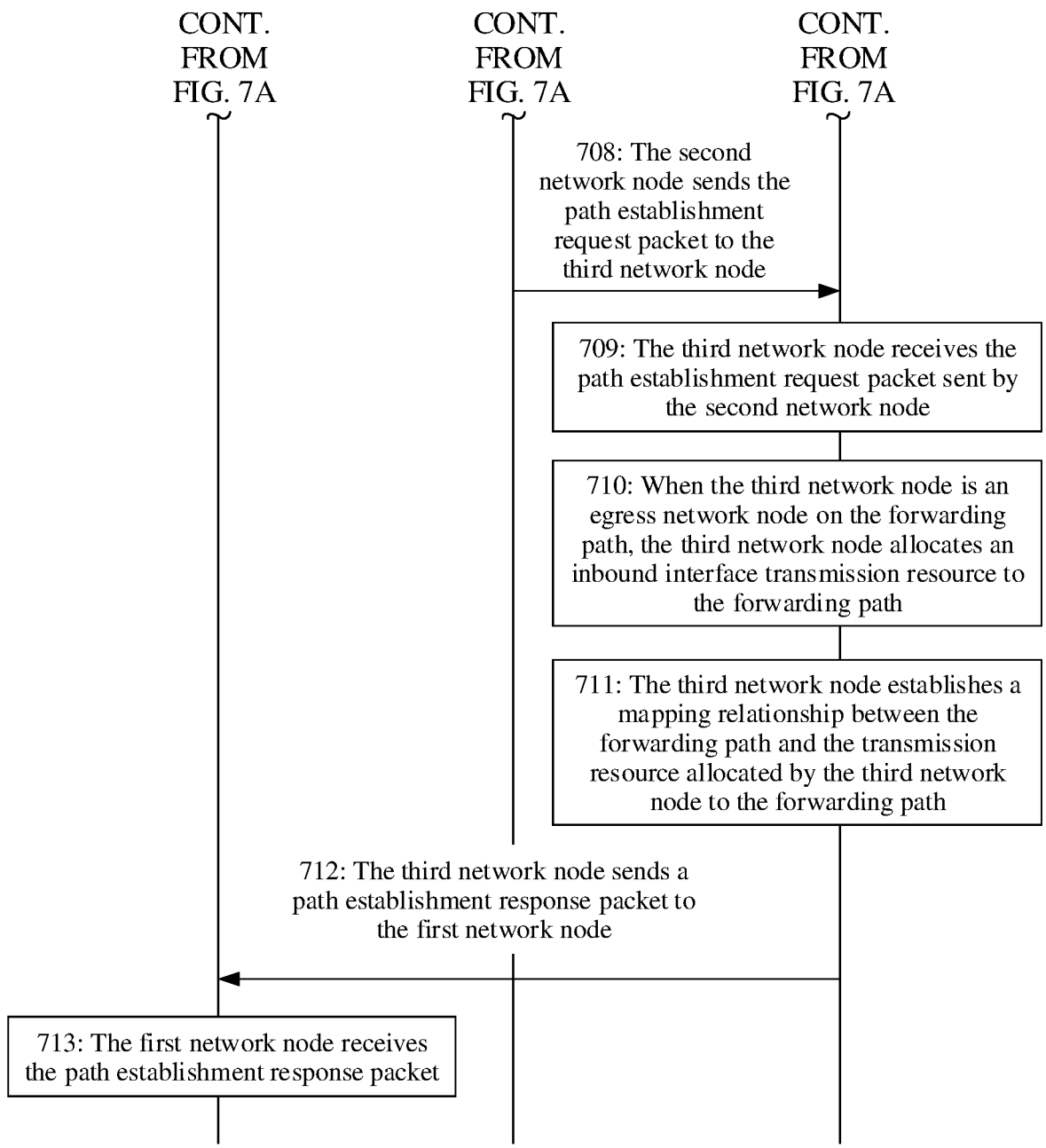

After the ingress network node receives the SR-Policy sent by the control node, if the SR-Policy includes the foregoing extended TLV, and the extended TLV indicates to establish the forwarding path, the ingress network node may obtain the path information from the SR-Policy, and establish the forwarding path based on the path information (for details, refer to FIG. 7A and FIG. 7B).

It should be noted that step 405 is a process in which the ingress network node obtains the path information of the to-be-established forwarding path. In addition to obtaining the path information from the control node, the ingress network node may further obtain the path information from configuration information, or the ingress network node may determine the path information based on the service requirement of the service flow.

A user may enter the path information on a configuration interface of the ingress network node. After detecting that the user completes configuration of path establishment information, the ingress network node is triggered to receive the configuration information that carries the path information, so that the ingress network node may obtain the path information from the configuration information.

A process in which the ingress network node determines the path information based on the service requirement of the service flow is similar to the process in which the control node determines the path information in step 403. In this embodiment of this application, the process in which the ingress network node determines the path information based on the service requirement of the service flow is not described in detail. In addition, it should be noted that the control node may further send the available transmission resource information of the plurality of network nodes to the ingress network node, so that the ingress network node may determine the path information based on the service requirement of the service flow and the available transmission resource information of the plurality of network nodes.

In a possible implementation, for any network node in the data transmission system, the network node may send the available transmission resource information to the control node, and may also send the available transmission resource information to the plurality of network nodes on the data transmission system. The plurality of network nodes may receive the available transmission resource information of the network node. The plurality of network nodes may be network nodes connected to the network node, or may be a network node other than the network node in the data transmission system. That is, the network node may send the available transmission resource information to another device on the network. The another device may be the control node on the network, or may be another network node on the network. The another network node on the network is another device in the data transmission system. Each network node in the data transmission system may send the available transmission resource information of the network node to the plurality of network nodes, so that each network node in the data transmission system can receive available transmission resource information of the another network node in the data transmission system. In this case, the ingress network node may not need to obtain the available transmission resource information of the plurality of network nodes from the control node, but directly receive the available transmission resource information sent by the plurality of network nodes.

After the ingress network node on the forwarding path obtains the path information of the forwarding path, the ingress network node may send the path establishment request packet to a next-hop network node on the forwarding path. Any intermediate network node on the forwarding path may allocate the transmission resource to the forwarding path based on the path establishment request packet, send the path establishment request packet to a next-hop network node of the intermediate network node on the forwarding path, until the egress network node on the forwarding path receives the path establishment request packet. If the egress network node also completes allocation of the transmission resource to the forwarding path, the egress network node directly sends the path establishment response packet to the ingress network node, to indicate that the forwarding path is established. To further describe this process, refer to a flowchart of a method for establishing a forwarding path according to an embodiment of this application shown in FIG. 7A and FIG. 7B. A procedure of the method may include the following steps 701 to 714.

701: A first network node generates a path establishment request packet based on obtained path information of a to-be-established forwarding path. A packet header of the path establishment request packet includes the path information, and the path establishment request packet is used to trigger a network node on the forwarding path to allocate a transmission resource to the forwarding path based on a transmission resource requirement.

The first network node may be an ingress network node on the forwarding path. A process in which the ingress network node obtains the path information is described above. Herein, step 701 is not described in detail in this embodiment of this application.

The path establishment request packet includes an SRH, and the SRH carries the path information. The path establishment request packet may be a data packet, or may be an ICMP packet. The packet header of the path establishment request packet may carry the path information. For any data packet that passes through each network node on the forwarding path, the first network node may add the SRH or an IPv6 packet header that carries the SRH to the data packet, to obtain the path establishment request packet. Alternatively, the first network node may add the SRH to the ICMP packet, to obtain the path establishment request packet. An SID list including connection establishment SIDs of all the network nodes on the forwarding path may be used as the path information of the forwarding path, that is, the packet header of the path establishment request packet carries the path information. The foregoing two processes of obtaining the path establishment request packet are both a process in which the first network node generates the path establishment request packet based on the path information.

Figure 8:
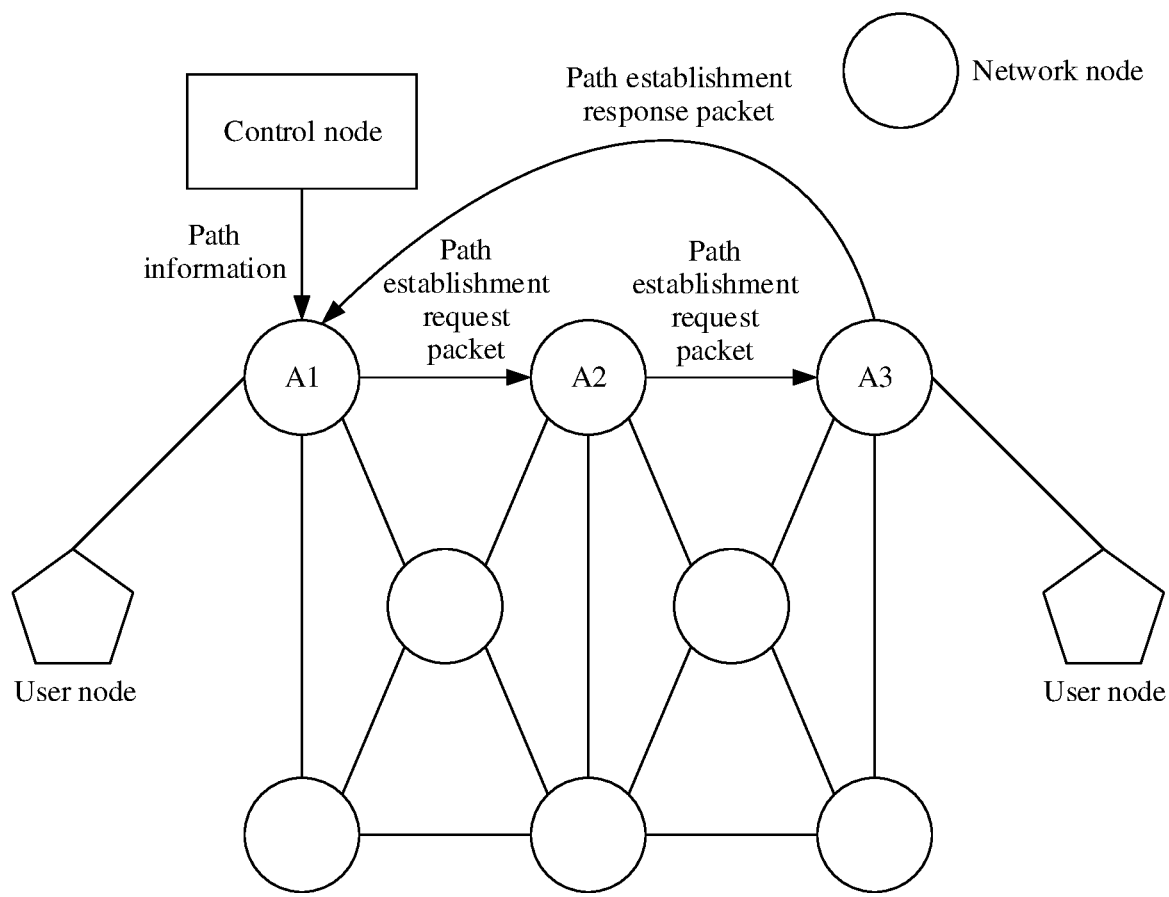
FIG. 8 is a schematic diagram of a process of establishing a forwarding path according to an embodiment of this application.

For example, FIG. 8 is a schematic diagram of a process of establishing the forwarding path according to an embodiment of this application. The forwarding path includes network nodes A1, A2, and A3, and the SID list in the SRH of the path establishment request packet is A3:M:1001:0000, A2::A203:1001:0000, and A1::A102:1001:0000. Because there is only one intermediate network node on the forwarding path, SL=1 in the SRH, where A3::M:1001:0000 is an End.R SID of the network node A3, and indicates to complete establishment of the forwarding path 1001 and feed back a path establishment success response to the ingress network node. A2::A203:1001:00 is an SID of the network node A2, and indicates the network node A2 to allocate a transmission resource to the forwarding path 1001 on an outbound interface 203 and an inbound interface of a next-hop node connected to the outbound interface 203. A1::A102:1001:0000 is an SID of the network node A1, and indicates the network node A1 to allocate a transmission resource to the forwarding path 1001 on an outbound interface 102 and an inbound interface of a next-hop node connected to the outbound interface 102.

It should be noted that the packet header of the path establishment request packet may be in another format. In a possible implementation, the packet header may be a newly defined target packet header used to establish the forwarding path, and the target packet header may carry the path information of the forwarding path. For example, the target packet header may alternatively include a segment identifier list, and the segment identifier list includes an SID of a forwarding node on the forwarding path. The target packet header may be encapsulated in a data packet in any application scenario. For example, in an SR multi-protocol label switching (multi-protocol label switching, MPLS) scenario, for the SR MPLS scenario, any edge network node on an SR MPLS network may be used as the ingress network node for establishing the forwarding path, the edge network node may encapsulate, in the data packet, the target packet header that carries the path information, to obtain the path establishment request packet, and establishes the forwarding paths on the SR MPLS network based on the path establishment request packet.

702: The first network node sends the path establishment request packet to a second network node, where the second network node is a next-hop network node of the first network node on the forwarding path.

The process shown in steps 701 and 702 is the process in which the first network node sends the path establishment request packet based on the path information.

703: The first network node allocates an interface transmission resource to the forwarding path based on the path information.

Because the first network node receives a user-side service flow, and transmits the service flow to the next-hop network node on the forwarding path, the first network node only needs to allocate an outbound interface transmission resource to the forwarding path, and does not need to allocate an inbound interface transmission resource to the forwarding path. The outbound interface transmission resource may be a slot resource allocated to the forwarding path on an outbound interface of the network node, and the inbound interface transmission resource may be a slot resource allocated to the forwarding path on an inbound interface of the network node.

The first network node may allocate the transmission resource to the forwarding path based on an SID of the first network node in the path information. In a possible implementation, the first network node may allocate the transmission resource to the forwarding path from the outbound interface transmission resource based on a transmission resource requirement included in the SID of the first network node in the segment identifier list in the path information, and the outbound interface is an outbound interface for connecting the first network node to the second network node.

The first network node may allocate an outbound interface slot to the path information. In a possible implementation, the first network node may allocate the outbound interface slot to the forwarding path from a slot of the outbound interface based on the transmission resource requirement included in the SID of the first network node. This process may be implemented by using a process shown in the following steps 7031 and 7032.

Step 7031: The first network node determines a quantity of target slots based on the transmission resource requirement included in the SID of the first network node, where the quantity of target slots is a quantity of slots required by the network node to forward the service flow.

A process shown in step 7031 is similar to a process in which the control node determines the quantity of target slots based on the transmission resource requirement in step 4031. Herein, step 7031 is not described in detail in this embodiment of this application.

Step 7032: The first network node allocates outbound interface slots of the quantity of target slots to the forwarding path from the slot of the outbound interface of the first network node.

The first network node may first determine an unallocated slot of an outbound interface indicated by an outbound interface identifier of the first network node, and then determine, based on the quantity of target slots, the outbound interface slot allocated to the forwarding path. In a possible implementation, the process shown in step 7032 may be implemented by using the following steps 70321 and 70322.

Step 70321: The first network node obtains the unallocated slot of the outbound interface indicated by the outbound interface identifier of the first network node.

The first network node may obtain the SID of the first network node from the path information, and obtain, from a function field of the SID, the outbound interface that is of the first network node and that is configured to establish the forwarding path. The first network node may query a local slot mapping table, and determine an allocated slot of the outbound interface from the slot mapping table, so that the first network node can determine the unallocated slot of the outbound interface.

A slot mapping table of any network node is used to store mapping relationships between an outbound interface, an outbound interface slot, an inbound interface, an inbound interface slot, and a forwarding path of the network node. Still based on FIG. 8, Table 1 is a slot mapping table of the network node A1 in FIG. 8, and a slot 1 and a slot 2 on the outbound interface 102 of the network node A1 are allocated to a forwarding path 1. A slot 3 on the outbound interface 102 is allocated to a forwarding path 2, and the network node A1 may determine, from the slot mapping table, an allocated slot of the outbound interface 102, so that the network node A1 may determine an unallocated slot of the outbound interface 102. Because the network node A1 is an ingress network node on the forwarding path, the ingress network node does not need to consider an inbound interface connected to a user side, but only needs to consider an outbound interface of the ingress network node. Therefore, both an inbound interface and an inbound interface slot of the network node A1 in the slot mapping table are null. It should be noted that, for any forwarding path passing through the network node, the forwarding path may correspond to a plurality of slots. For example, the forwarding path 1 in Table 1 separately corresponds to the slot 1 and the slot 2 of the outbound interface 102. In this case, the slot 1 and the slot 2 are located in different rows. Certainly, an outbound interface slot of any forwarding path may be stored in a same row of the slot mapping table. For example, the slot 1 and the slot 2, on the outbound interface 102, that are allocated to the forwarding path 1 are recorded in one row of the table, and both the slot 1 and the slot 2 are located in a same cell of the outbound interface slot. In addition, the cell, a cell in which the forwarding path 1 is located, and a cell in which the outbound interface 102 is located are all located in a same row of the slot mapping table.

TABLE 1

| Forwarding path | Inbound interface | Inbound interface slot | Outbound interface | Outbound interface slot |
|---|---|---|---|---|
| Forwarding path 1 | Null | Null | 102 | Slot 1 |
| Forwarding path 1 | Null | Null | 102 | Slot 2 |
| Forwarding path 2 | Null | Null | 102 | Slot 3 |

It should be noted that a slot mapping table of any network node may further record mapping relationships between a FlexE client and an outbound interface, an outbound interface slot, an inbound interface, an inbound interface slot, and a forwarding path of the network node. Because one FlexE client on one network node corresponds to one service flow, the service flow is transmitted on only one forwarding path, and the FlexE client corresponds to one pair of inbound and outbound interfaces (located on two network nodes). Therefore, the network node may further add, to the slot mapping table, the FlexE client allocated by the network node to the service flow, so that the slot mapping table may further record the mapping relationships between the FlexE client and the outbound interface, the outbound interface slot, the inbound interface, the inbound interface slot, and the forwarding path of the network node. Alternatively, the network node may directly add a FlexE client entry to the slot mapping table shown in Table 1, to establish the mapping relationships between the FlexE client and the outbound interface, the outbound interface slot, the inbound interface, the inbound interface slot, and the forwarding path of the network node.

Step 70322: When a total quantity of unallocated slots of the outbound interface is greater than or equal to the quantity of target slots, the first network node allocates outbound interface slots of the quantity of target slots in the unallocated slots of the outbound interface to the forwarding path.

When the total quantity of unallocated slots of the outbound interface is greater than or equal to the quantity of target slots, it indicates that transmission resources of the outbound interface of the first network node are sufficient, and the first network node may randomly select and allocate the outbound interface slots of the quantity of target slots in the unallocated slots of the outbound interface to the forwarding path. Certainly, the first network node may further select and allocate adjacent outbound interface slots of the quantity of target slots in the unallocated slots of the outbound interface to the forwarding path. Certainly, in addition to allocating the outbound interface slots of the quantity of target slots to the forwarding path, the first network node may further allocate at least one extra outbound interface slot to the forwarding path, to improve efficiency of subsequently forwarding data on the forwarding path by the first network node. In a possible implementation, the first network node may further allocate outbound interface slots of a first quantity of target slots in the unallocated slots of the outbound interface to the forwarding path, where the first quantity of target slots is greater than the quantity of target slots.

It should be noted that, when the total quantity of unallocated slots of the outbound interface is less than the quantity of target slots, it indicates that the transmission resources of the outbound interface of the first network node are insufficient, and the first network node fails to allocate the transmission resource to the forwarding path. The first network node may generate a path establishment failure response, and the path establishment failure response indicates that the forwarding path fails to be established, that is, a process in which the first network node generates the path establishment failure response when the transmission resource fails to be allocated to the forwarding path.

If the path information obtained by the first network node is from the control node, when the first network node obtains the path establishment failure response, the first network node may send the path establishment failure response to the control node, to notify the control node that the forwarding path fails to be established. If the path information obtained by the first network node is generated by the first network node, the first network node does not need to send the path establishment failure response to the control node. The path establishment failure response may carry an identifier of a network node that fails to establish the path, a failure identifier, and an outbound interface or an inbound interface of the network node that fails to establish the path, where the failure identifier indicates that the path establishment fails.

After allocating the outbound interface transmission resource to the forwarding path based on the path information, the first network node may further trigger the next-hop network node to allocate the inbound interface transmission resource to the forwarding path. In a possible implementation, the first network node sends an inbound interface resource request message to the second network node, where the inbound interface resource request message indicates the second network node to allocate the inbound interface slot to the forwarding path based on the outbound interface slot allocated by the first network node to the forwarding path.

The inbound interface resource request message sent by the first network node may include an identifier of the forwarding path and an identifier of the slot allocated by the first network node to the forwarding path. Therefore, the second network node receives the inbound interface resource request message, to trigger the second network node to allocate the inbound interface transmission resource to the forwarding path.

704: The first network node establishes a mapping relationship between the forwarding path and the transmission resource allocated by the first network node to the forwarding path, to establish the forwarding path.

After the first network node determines the outbound interface slot allocated to the forwarding path, the first network node may record, in the local slot mapping table, the outbound interface slot allocated to the forwarding path, to establish a mapping relationship between the forwarding path and the interface transmission resource allocated by the first network node to the forwarding path. For example, if the network node A1 allocates a slot 4 and a slot 5 of the outbound interface 102 to a forwarding path 1002, the network node A1 may add related information to Table 1, so that Table 1 is changed to Table 2, and the network node A1 can subsequently transmit, based on Table 2, a packet on the forwarding path 1001 in the slot 4 and the slot 5 of the outbound interface 102.

TABLE 2

| Forwarding path | Inbound interface | Inbound interface slot | Outbound interface | Outbound interface slot |
|---|---|---|---|---|
| Forwarding path 1 | Null | Null | 102 | Slot 1 |
| Forwarding path 1 | Null | Null | 102 | Slot 2 |
| Forwarding path 2 | Null | Null | 102 | Slot 3 |
| Forwarding path 1001 | Null | Null | 102 | Slot 4 |
| Forwarding path 1001 | Null | Null | 102 | Slot 5 |

705: The second network node receives the path establishment request packet sent by the first network node.

Still based on FIG. 8, the second network node is the network node A2 in FIG. 8, and the network node A2 may receive the path establishment request packet sent by the network node A1. It should be noted that before the second network node receives the path establishment request packet, the second network node may further generate an SID corresponding to the second network node. The SID includes a function field, and the function field identifies that the second network node can allocate a transmission resource to a service forwarding path. The second network node may further send the SID of the second network node to another device on a network, so that when receiving the SID of the second network node, the another device may learn that the second network node may be used to establish the forwarding path. Certainly, any network node on the network may generate an SID of the network node, and send the SID of the network node to another device.

706: The second network node allocates the transmission resource to the forwarding path based on the path information.

After the second network node receives the path establishment request packet, if a destination address in the path establishment request packet is the SID of the second network node, the second network node may allocate an outbound interface transmission resource to the forwarding path based on the path information, and triggers a next-hop network node to allocate an inbound interface transmission resource to the forwarding path.

The second network node may allocate the transmission resource to the forwarding path based on the SID of the second network node in the path information. In a possible implementation, the second network node may allocate the transmission resource to the forwarding path from the outbound interface transmission resource based on a transmission resource requirement included in the SID of the second network node in the segment identifier list in the path information. The outbound interface is an outbound interface for connecting the second network node to a third network node, and the third network node is the next-hop network node of the second network node on the forwarding path.

The second network node may allocate an outbound interface slot to the path information. In a possible implementation, the second network node may allocate the outbound interface slot to the forwarding path from a slot of the outbound interface based on the transmission resource requirement included in the SID of the second network node. This process may be implemented by using a process shown in the following steps 7061 and 7062.

Step 7061: The second network node determines a quantity of target slots based on the transmission resource requirement included in the SID of the second network node.

A process shown in step 7061 is similar to that shown in step 7031. Herein, step 7061 is not described in detail in this embodiment of this application.

Step 7062: The second network node allocates outbound interface slots of the quantity of target slots to the forwarding path from the slot of the outbound interface of the second network node.

A process shown in step 7062 is similar to that shown in step 7032. Herein, step 7062 is not described in detail in this embodiment of this application.

It should be noted that, when a total quantity of unallocated slots of the outbound interface of the second network node is less than the quantity of target slots, it indicates that transmission resources of the outbound interface of the second network node are insufficient, that is, the second network node fails to allocate the transmission resource to the forwarding path. In this case, the second network node may send a path establishment failure response to the ingress network node on the forwarding path. In this case, an interface in the path establishment failure response is the outbound interface of the second network node. Certainly, the second network node may not send the path establishment failure response to the ingress network node, but send the path establishment failure response to the control node, and then the control node forwards the path establishment failure response to the ingress network node. When the ingress network node receives the path establishment failure response of any network node on the forwarding path, the ingress network node sends a path withdrawal packet to each network node on the forwarding path, and the path withdrawal packet indicates the network node on the forwarding path to withdraw the transmission resource allocated to the forwarding path. A packet header of the path withdrawal packet may carry the identifier of the forwarding path and a withdrawal identifier. The withdrawal identifier indicates the network node on the forwarding path to withdraw the transmission resource allocated to the forwarding path. The path withdrawal packet may also be an ICMP packet. When any network node on the forwarding path receives the path withdrawal packet, the network node may delete information related to the forwarding path from a slot mapping table of the network node.

When the second network node is not an egress network node on the forwarding path, the second network node sends an inbound interface resource request message to the third network node, where the inbound interface resource request message indicates the third network node to allocate an inbound interface slot to the forwarding path based on the outbound interface slot allocated by the second network node to the forwarding path. The inbound interface resource request message sent by the second network node may include the identifier of the forwarding path and an identifier of the slot allocated by the second network node to the forwarding path. Therefore, the third network node receives the inbound interface resource request message, to trigger the third network node to allocate the inbound interface transmission resource to the forwarding path.

It should be noted that, in addition to receiving the path establishment request packet sent by the first network node, the second network node may further receive the inbound interface resource request message sent by the first network node, and allocate the inbound interface transmission resource to the forwarding path based on the inbound interface resource request message sent by the first network node. In a possible implementation, when performing step 706, the second network node may further perform the following steps A and B.

Step A: The second network node receives the inbound interface resource request message sent by the first network node, where the inbound interface resource request message sent by the first network node includes the identifier of the forwarding path and the identifier of the slot allocated by the first network node to the forwarding path.

Step B: The second network node allocates the inbound interface transmission resource to the forwarding path based on an inbound interface connected to the outbound interface of the first network node and the identifier of the slot allocated by the first network node to the forwarding path.

In a forwarding direction, for a pair of inbound and outbound interfaces on two network nodes, each slot of an outbound interface of one network node is in a one-to-one correspondence with each slot of an inbound interface of the other network node. Therefore, the second network node may allocate a target slot of the inbound interface connected to the outbound interface of the first network node to the forwarding path. The target slot is a slot that is of the inbound interface and that corresponds to an outbound interface slot carried in the inbound interface resource request message.

707: The second network node establishes a mapping relationship between the forwarding path and the transmission resource allocated by the second network node to the forwarding path, to establish the forwarding path.

When the service flow is subsequently transmitted on the forwarding path, and the second network node is an intermediate network node on the forwarding path, the second network node needs to receive the service flow sent by the first network node, and sends the service flow to the third network node. In this case, the second network node needs to allocate the inbound interface transmission resource to the forwarding path, and also needs to allocate the outbound interface transmission resource to the forwarding path. Therefore, that the second network node has allocated the outbound interface transmission resource and the inbound interface transmission resource to the forwarding path means that the second network node has allocated the transmission resource to the forwarding path.

After the second network node determines the outbound interface slot and the inbound interface slot that are allocated to the forwarding path, the second network node may record, in the local slot mapping table, the outbound interface slot and the inbound interface slot that are allocated to the forwarding path, to establish a mapping relationship between the forwarding path and the interface transmission resource allocated by the intermediate network node to the forwarding path. For example, the network node A2 may store, in an associated manner, in a slot mapping table (Table 3) of the network node A2, an inbound interface transmission resource and an outbound interface transmission resource that are allocated to the forwarding path 1001. It can be learned from Table 3 that the network node A2 allocates inbound interface slots 4 and 5 of an inbound interface 201 to the forwarding path 1001, and allocates outbound interface slots 1 and 2 of the outbound interface 203 to the forwarding path 1001.

TABLE 3

| Forwarding path | Inbound interface | Inbound interface slot | Outbound interface | Outbound interface slot |
|---|---|---|---|---|
| Forwarding path 1001 | 201 | Slot 4 | 203 | Slot 1 |
| Forwarding path 1001 | 201 | Slot 5 | 203 | Slot 2 |

708: The second network node sends the path establishment request packet to the third network node.

The second network node may send the path establishment request packet to the third network node based on a packet forwarding mechanism on an SRv6 network. The foregoing describes the packet forwarding mechanism on the SRv6 network. Herein, step 708 is not described in detail in this embodiment of this application. When the second network node is the intermediate network node on the forwarding path, the second network node may perform step 708. When the second network node is the ingress network node on the forwarding path, step 708 does not need to be performed.

It should be noted that when the path establishment request packet is the data packet, even if transmission resources of any network node on the forwarding path are insufficient, the network node still needs to send the path establishment request packet to a next-hop network node. In this way, data carried in the path establishment request packet can continue to be forwarded, to ensure normal transmission of the data packet, so that the network node can also establish the forwarding path when sending the data packet.

Step 708 and steps 706 and 707 may be simultaneously performed. An execution sequence of steps 706, 707, and 708 is not specifically limited in this embodiment of this application. Each intermediate network node on the forwarding path needs to perform the process shown in steps 705 to 708, so that each intermediate network node can allocate an outbound interface transmission resource and an inbound interface transmission resource to the forwarding path. Therefore, the intermediate network node may form a connection between the intermediate network nodes on the forwarding path by using the interface transmission resources allocated to the forwarding path, to establish the forwarding path.

709: The third network node receives the path establishment request packet sent by the second network node.

After any network node receives the path establishment request packet, if a current destination address of the path establishment request packet is an SID of the network node, and an SL in an SRH of the path establishment request packet is 0, it indicates that the network node is the last network node on the forwarding path, namely, the egress network node.

710: When the third network node is the egress network node on the forwarding path, the third network node allocates the inbound interface transmission resource to the forwarding path.

When the third network node is an intermediate network node on the forwarding path, the third network node performs a process performed by the second network node. When the third network node is the egress network node on the forwarding path, the third network node may allocate the inbound interface transmission resource to the forwarding path based on the inbound interface resource request message sent by the second network node.

A process in which the third network node allocates the inbound interface transmission resource to the forwarding path based on the inbound interface resource request message sent by the second network node is similar to a process in which the second network node allocates the inbound interface transmission resource to the forwarding path based on the inbound interface resource request message sent by the first network node. Step 710 is not described in detail in this embodiment of this application.

Because the egress network node receives a service flow sent by a previous network node on the forwarding path, and transmits the service flow to the user side, the egress network node only needs to allocate the inbound interface transmission resource to the forwarding path, and does not need to allocate the outbound interface transmission resource to the forwarding path. Therefore, when the third network node is the egress network node on the forwarding path, and the third network node has allocated the inbound interface transmission resource to the forwarding path, it means that the third network node has allocated the transmission resource to the forwarding path.

711: The third network node establishes a mapping relationship between the forwarding path and the transmission resource allocated by the third network node to the forwarding path, to establish the forwarding path.

After the third network node determines an inbound interface slot allocated to the forwarding path, the third network node may record, in the local slot mapping table, the inbound interface slot allocated to the forwarding path, to establish the mapping relationship between the forwarding path and the transmission resource allocated by the third network node to the forwarding path.

712: When the third network node has allocated the inbound interface transmission resource to the forwarding path and receives the path establishment request packet sent by the second network node, the third network node sends a path establishment response packet to the first network node, where the path establishment response packet indicates that the forwarding path is established.

The path establishment response packet may include the identifier of the forwarding path and a success identifier, and the success identifier indicates that the forwarding path is successfully established. The third network node does not need to send the path establishment response packet to the first network node by using the forwarding path, but may send the path establishment response packet to the first network node based on the identifier that is of the first network node and that is carried in the path information, for example, the network node A3 in FIG. 8. When the network node A3 has allocated an inbound interface transmission resource to the forwarding path, and receives the path establishment request packet sent by the network node A2, the network node A3 directly sends a path establishment response packet to the network node A1.

713: The first network node receives the path establishment response packet.

After receiving the path establishment response packet, the first network node may determine that the forwarding path is successfully established. In addition to determining, by using the path establishment response packet, that the forwarding path is successfully established, the first network node may further determine, based on a resource allocation complete response sent by each network node on the forwarding path, that the forwarding path is successfully established. A resource allocation complete response of a network node indicates that the network node has allocated a transmission resource to the forwarding path, and the resource allocation complete response of the network node may include the identifier of the forwarding path and the transmission resource allocated by the network node to the forwarding path.

In a possible implementation, after allocating the transmission resource to the forwarding path, any network node on the forwarding path may send the resource allocation complete response to the first network node. When the forwarding path is established, after the first network node may receive the resource allocation complete response sent by each network node on the forwarding path, the first network node may determine, based on the resource allocation complete response sent by each network node on the forwarding path, that the forwarding path is successfully established.

It should be noted that, after determining that the forwarding path is successfully established, the first network node may send the identifier of the forwarding path and information corresponding to the forwarding path to another device on the network, to notify the another device of the information about the forwarding path. The information about the forwarding path may include the identifier of the network node on the forwarding path and a path status identifier. The path status identifier indicates that the forwarding path is in a path establishment success state. In this case, the forwarding path may be used to transmit data. The information about the forwarding path may further include an identifier of a slot allocated by each network node on the forwarding path to the forwarding path. The another device may be the control node on the network, or another network node on the network.

When the first network node sends the identifier of the forwarding path to the another device, the another device may add the identifier (a path SID) of the forwarding path to an SID list of the data packet. When receiving the data packet that carries the SID list, the first network node may forward the data packet on the forwarding path indicated by the path SID.

After the forwarding path is established, if any network node on the forwarding path is faulty, the network node may send fault information to the first network node on the forwarding path, where the fault information indicates that the network node is faulty, to report a fault to the first network node. The fault information may be carried in an ICMP packet.

The network node that is on the forwarding path and that is carried in the path information may not be all network nodes on the forwarding path, but a part of network nodes on the forwarding path. For any two adjacent network nodes included in the path information, a plurality of forwarding sub-paths may also be established between the two adjacent network nodes. An ingress network node on each forwarding sub-path is the first network node in the two adjacent network nodes, and an egress network node on each forwarding sub-path is the second network node in the two adjacent network nodes. The ingress network node on each forwarding sub-path may establish each forwarding sub-path by using a process similar to steps 701 to 713, so that a plurality of paths may be selected when the service flow is subsequently transmitted on the forwarding path, to implement load balancing.

In this method provided in embodiments of this application, the network node allocates the transmission resource to the forwarding path based on the path information in the path establishment request packet, to establish the forwarding path, and the control node does not need to configure each network node on the forwarding path, so that a process of establishing the forwarding path can be simplified. In addition, the transmission resource on the outbound interface is allocated to the forwarding path, so that after the forwarding path is established, the first network node can output the data on the forwarding path based on the transmission resource, of the outbound interface, allocated to the forwarding path. In addition, the identifier of the forwarding path and the information corresponding to the forwarding path are sent to the another device, to notify the another forwarding device that the forwarding path is established, and the another device may also use the data transmitted by using the forwarding path. In addition, a new protocol used to establish the forwarding path does not need to be defined on the network, and an existing protocol on the network may be reused to establish the forwarding path.

Figure 9:
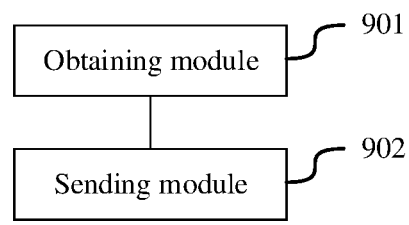
FIG. 9 is a schematic diagram of a structure of an apparatus for establishing a forwarding path according to an embodiment of this application.

FIG. 9 is a schematic diagram of a structure of an apparatus for establishing a forwarding path according to an embodiment of this application. The apparatus 900 is a first network node, and the apparatus 900 includes an obtaining module 901, configured to obtain path information of a to-be-established forwarding path, where the path information includes an identifier of a network node on the forwarding path and a transmission resource requirement that needs to be allocated by the network node to the forwarding path, and a sending module 902, configured to send a path establishment request packet based on the path information, where a packet header of the path establishment request packet includes the path information, and the path establishment request packet is used to trigger the network node to allocate a transmission resource to the forwarding path based on the transmission resource requirement.

Optionally, the path information includes a segment identifier list. The segment identifier list includes a segment identifier (SID) of the network node, and an SID of one network node includes an identifier of the network node and a transmission resource requirement that needs to be allocated by the network node to the forwarding path.

Optionally, the SID of the network node further includes an identifier of the forwarding path.

Optionally, the identifier of the forwarding path is an SID of the forwarding path.

Optionally, the transmission resource requirement includes a quantity of target slots or a target bandwidth, where the quantity of target slots is a quantity of slots required by the network node to forward a service flow, and the target bandwidth is a bandwidth required by the network node to forward the service flow.

Optionally, the apparatus further includes an allocation module, configured to allocate the transmission resource to the forwarding path from a transmission resource of an outbound interface based on a transmission resource requirement included in an SID of the first network node in the segment identifier list, where the outbound interface is an outbound interface that is of the first network node and that is connected to a second network node, and the second network node is a next-hop network node of the first network node on the forwarding path.

Optionally, the allocation module is configured to allocate an outbound interface slot to the forwarding path from a slot of the outbound interface based on the transmission resource requirement included in the SID of the first network node.

Optionally, the sending module 902 is further configured to send an inbound interface resource request message to the second network node, where the inbound interface resource request message indicates the second network node to allocate an inbound interface slot to the forwarding path based on the outbound interface slot allocated by the first network node to the forwarding path.

Optionally, the allocation module is configured to determine a quantity of target slots based on the transmission resource requirement included in the SID of the first network node, where the quantity of target slots is a quantity of slots required by the network node to forward a service flow, and allocate outbound interface slots of the quantity of target slots to the forwarding path from the slot of the outbound interface.

Optionally, the apparatus further includes an establishment module, configured to establish a mapping relationship between the forwarding path and the transmission resource allocated by the first network node to the forwarding path.

Optionally, the obtaining module 901 is further configured to receive a path establishment response packet sent by an egress network node on the forwarding path, where the path establishment response packet indicates that the forwarding path is established, or receive a resource allocation complete response packet sent by each network node on the forwarding path, and determine, based on the resource allocation complete response packet sent by each network node on the forwarding path, that the forwarding path is successfully established.

Optionally, the sending module 902 is further configured to send an identifier of the forwarding path and information corresponding to the forwarding path to another device on a network after it is determined that the forwarding path is successfully established.

Optionally, the another device includes a control node or a plurality of network nodes except the network node on the forwarding path.

Optionally, the apparatus further includes a generation module, configured to generate a path establishment failure response when the transmission resource fails to be allocated to the forwarding path, where the path establishment failure response indicates that the forwarding path fails to be established.

Optionally, when a quantity of unallocated slots of the outbound interface of the first network node is less than the quantity of target slots, the transmission resource fails to be allocated to the forwarding path. The outbound interface is the outbound interface that is of the first network node and that is connected to the second network node, and the second network node is the next-hop network node of the first network node on the forwarding path.

Optionally, the sending module 902 is further configured to send available transmission resource information to another device on a network, where the available transmission resource information indicates an unallocated transmission resource on each interface of the first network node.

Optionally, the path establishment request packet includes a segment routing header (SRH), and the SRH carries the path information.

Optionally, the path establishment request packet is a data packet or an internet control message protocol (ICMP) packet.

Optionally, the obtaining module 901 is configured to receive the path information sent by the control node, determine the path information based on a service requirement of the service flow, or obtain the path information from configuration information.

Optionally, the obtaining module 901 is further configured to receive a path establishment failure response sent by the network node on the forwarding path, and send a path withdrawal packet to the network node on the forwarding path.

The path establishment failure response indicates that the forwarding path fails to be established, and the path withdrawal packet indicates the network node on the forwarding path to withdraw the transmission resource allocated to the forwarding path.

Optionally, a packet header of the path withdrawal packet carries the identifier of the forwarding path and a withdrawal identifier. The withdrawal identifier indicates the network node on the forwarding path to withdraw the transmission resource allocated to the forwarding path, or the path withdrawal packet is an ICMP packet.

This apparatus allocates, by using the network node, the transmission resource to the forwarding path based on the path information in the path establishment request packet to establish the forwarding path, and the control node does not need to configure each network node on the forwarding path, so that a process of establishing the forwarding path can be simplified.

Figure 10:
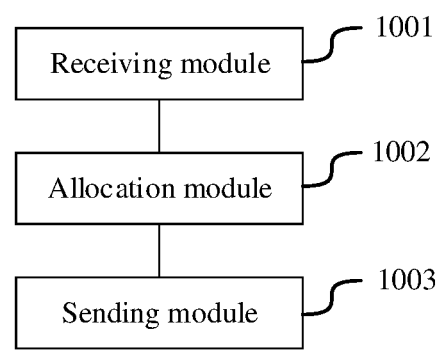
FIG. 10 is a schematic diagram of a structure of an apparatus for establishing a forwarding path according to an embodiment of this application.

FIG. 10 is a schematic diagram of a structure of an apparatus for establishing a forwarding path according to an embodiment of this application. The apparatus 1000 is a second network node, and the apparatus 1000 includes a receiving module 1001, configured to receive a path establishment request packet sent by a first network node, where a packet header of the path establishment request packet includes path information, and the path information includes an identifier of a network node on the forwarding path and a transmission resource requirement that needs to be allocated by the network node to the forwarding path, an allocation module 1002, configured to allocate a transmission resource to the forwarding path based on the path information, and a sending module 1003, configured to send the path establishment request packet.

Optionally, the path information includes a segment identifier list. The segment identifier list includes a segment identifier (SID) of the network node, and an SID of one network node includes an identifier of the network node and a transmission resource requirement that needs to be allocated by the network node to the forwarding path.

Optionally, the SID of the network node further includes an identifier of the forwarding path.

Optionally, the identifier of the forwarding path is an SID of the forwarding path.

Optionally, the transmission resource requirement includes a quantity of target slots or a target bandwidth, where the quantity of target slots is a quantity of slots required by the network node to forward a service flow, and the target bandwidth is a bandwidth required by the network node to forward the service flow.

Optionally, the allocation module 1002 is configured to allocate the transmission resource to the forwarding path from a transmission resource of an outbound interface based on a transmission resource requirement included in an SID of the second network node in the segment identifier list, where the outbound interface is an outbound interface that is of the second network node and that is connected to a third network node, and the third network node is a next-hop network node of the second network node on the forwarding path.

Optionally, the allocation module 1002 is configured to allocate an outbound interface slot to the forwarding path from a slot of the outbound interface based on the transmission resource requirement included in the SID of the second network node.

Optionally, the sending module 1003 is further configured to send an inbound interface resource request message to the third network node, where the inbound interface resource request message indicates the third network node to allocate an inbound interface slot to the forwarding path based on the outbound interface slot allocated by the second network node to the forwarding path.

Optionally, the allocation module 1002 is configured to determine a quantity of target slots based on the transmission resource requirement included in the SID of the second network node, where the quantity of target slots is a quantity of slots required by the network node to forward a service flow, and allocate outbound interface slots of the quantity of target slots to the forwarding path from the slot of the outbound interface.

Optionally, the apparatus further includes an establishment module, configured to establish a mapping relationship between the forwarding path and the transmission resource allocated by the second network node to the forwarding path.

Optionally, the sending module 1003 is further configured to send a resource allocation complete response packet to an ingress network node on the forwarding path after the transmission resource is allocated to the forwarding path.

Optionally, the apparatus further includes a generation module, configured to generate the SID corresponding to the second network node, where the SID includes a function field, and the function field identifies that the second network node can allocate the transmission resource to the service forwarding path.

Optionally, the sending module 1003 is further configured to after the forwarding path is established, if a fault occurs on the second network node, send fault information to an ingress network node on the forwarding path, where the fault information indicates that the fault occurs on the second network node.

Optionally, the fault information is carried in an ICMP packet.

Optionally, the sending module 1003 is further configured to send a path establishment failure response to an ingress network node on the forwarding path when the transmission resource fails to be allocated to the forwarding path, where the path establishment failure response indicates that the forwarding path fails to be established.

Optionally, when the quantity of target slots is greater than a total data amount of unallocated slots of the outbound interface of the second network node, the interface transmission resource fails to be allocated to the forwarding path. The outbound interface is the outbound interface that is of the second network node and that is connected to the third network node, and the third network node is the next-hop network node of the second network node on the forwarding path, or when the target bandwidth is less than an available bandwidth of the outbound interface of the second network node, the interface transmission resource fails to be allocated to the forwarding path.

Optionally, the sending module 1003 is further configured to send available transmission resource information to another device on a network, where the available transmission resource information indicates an unallocated transmission resource on each interface of the second network node.

Optionally, the path establishment request packet includes an SRH, and the SRH carries the path information.

Optionally, the path establishment request packet is a data packet or an ICMP packet.

Optionally, the apparatus further includes a deletion module.

The receiving module 1001 is further configured to receive a path withdrawal packet, where the path withdrawal packet indicates the network node on the forwarding path to withdraw the transmission resource allocated to the forwarding path.

The deletion module is configured to delete the mapping relationship between the forwarding path and the transmission resource allocated by the second network node to the forwarding path.

Optionally, a packet header of the path withdrawal packet carries the identifier of the forwarding path and a withdrawal identifier. The withdrawal identifier indicates the network node on the forwarding path to withdraw the transmission resource allocated to the forwarding path, or the path withdrawal packet is an ICMP packet.

This apparatus allocates, by using the network node, the transmission resource to the forwarding path based on the path information in the path establishment request packet to establish the forwarding path, and a control node does not need to configure each network node on the forwarding path, so that a process of establishing the forwarding path can be simplified.

All the foregoing optional technical solutions may be randomly combined to form optional embodiments of this disclosure. Details are not described herein again.

It should be noted that, when the apparatus for establishing a forwarding path provided in the foregoing embodiment establishes the forwarding path, division of the foregoing functional modules is merely used as an example for description. In actual application, the foregoing functions may be allocated to different functional modules for implementation based on a requirement, that is, an internal structure of the apparatus is divided into different functional modules, to complete all or some of the functions described above. In addition, embodiments of the method for establishing the forwarding path provided in the foregoing embodiments belong to a same concept. For a specific implementation process, refer to the method embodiments. Details are not described herein again.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing description is merely examples of embodiments of this application, but are not intended to limit this application. Any modification, equivalent replacement, or improvement made without departing from the spirit and principle of this application shall fall within the protection scope of this application.

What is claimed is:

1. A method for establishing a forwarding path, comprising:

obtaining, by a first network node, path information of a to-be-established forwarding path, wherein the path information comprises an identifier of a network node on the forwarding path and a transmission resource requirement that needs to be allocated by the network node to the forwarding path; and sending a path establishment request packet based on the path information, wherein a packet header of the path establishment request packet comprises the path information, wherein the path information is carried in a segment routing header (SRH) of a path establishment request packet, and wherein the path establishment request packet triggers the network node to allocate a transmission resource to the forwarding path based on the transmission resource requirement.

2. The method according to claim 1, wherein the transmission resource requirement comprises a quantity of target slots or a target bandwidth, wherein the quantity of target slots is a quantity of slots required by the network node to forward a service flow, and wherein the target bandwidth is a bandwidth required by the network node to forward the service flow.

3. The method according to claim 1, wherein the path information comprises a segment identifier list, wherein the segment identifier list comprises a segment identifier (SID) of the network node, and wherein an SID of one network node comprises an identifier of the network node and a transmission resource requirement that needs to be allocated by the network node to the forwarding path; and wherein the method further comprises:

allocating a transmission resource to the forwarding path from a transmission resource of an outbound interface based on a transmission resource requirement in an SID of the first network node in the segment identifier list, wherein the outbound interface is an outbound interface that is of the first network node and that is connected to a second network node, and wherein the second network node is a next-hop network node of the first network node on the forwarding path.

4. The method according to claim 3, wherein the allocating the transmission resource to the forwarding path comprises:

allocating an outbound interface slot to the forwarding path from a slot of the outbound interface based on the transmission resource requirement comprised in the SID of the first network node.

5. The method according to claim 4, further comprising performing, after the allocating the outbound interface slot to the forwarding path from the slot of the outbound interface:

sending an inbound interface resource request message to the second network node, wherein the inbound interface resource request message indicates to the second network node to allocate an inbound interface slot to the forwarding path based on the outbound interface slot allocated by the first network node to the forwarding path.

6. The method according to claim 4, wherein the allocating the outbound interface slot to the forwarding path from the slot of the outbound interface comprises:

determining a quantity of target slots based on the transmission resource requirement comprised in the SID of the first network node, wherein the quantity of target slots is a quantity of slots required by the network node to forward a service flow; and allocating outbound interface slots of the quantity of target slots to the forwarding path from the slot of the outbound interface.

7. The method according to claim 3, further comprising:

generating a path establishment failure response in response to the transmission resource failing to be allocated to the forwarding path, wherein the path establishment failure response indicates that the forwarding path fails to be established.

8. The method according to claim 3, further comprising performing, after the allocating the transmission resource to the forwarding path from a transmission resource of the outbound interface:

establishing a mapping relationship between the forwarding path and the transmission resource allocated by the first network node to the forwarding path.

9. The method according to claim 1, further comprising performing at least one of:

receiving a path establishment response packet sent by an egress network node on the forwarding path, wherein the path establishment response packet indicates that the forwarding path is established; or receiving a resource allocation complete response packet sent by each network node on the forwarding path, and determining, based on the resource allocation complete response packet sent by each network node on the forwarding path, that the forwarding path is successfully established; and wherein the method further comprises:

sending an identifier of the forwarding path and information corresponding to the forwarding path to another device on a network after determining that the forwarding path is successfully established.

10. The method according to claim 1, further comprising performing, before obtaining a segment identifier list corresponding to the to-be-established forwarding path:

sending available transmission resource information to another device on a network, wherein the available transmission resource information indicates an unallocated transmission resource on each interface of the first network node.

11. The method according to claim 1, further comprising obtaining a segment identifier list corresponding to the to-be-established forwarding path by performing at least one of:

receiving the segment identifier list sent by a control node;

determining the segment identifier list based on a service requirement of a service flow; or obtaining the segment identifier list from configuration information.

12. An apparatus, comprising:

one or more processors; and a non-transitory computer readable medium having a computer program stored thereon for execution by the one or more processors to establish a forwarding path and act as a first network node, the computer program including instructions to:
- obtain path information corresponding to a to-be-established forwarding path, wherein the path information comprises an identifier of a network node on the forwarding path and a transmission resource requirement that needs to be allocated by the network node to the forwarding path; and
- send a path establishment request packet based on the path information, wherein a packet header of the path establishment request packet comprises the path information wherein the path information is carried in a segment routing header (SRH) of a path establishment request packet, and wherein the path establishment request packet triggers the network node to allocate a transmission resource to the forwarding path based on the transmission resource requirement.

13. The apparatus according to claim 12, wherein the path information comprises a segment identifier list, wherein the segment identifier list comprises a segment identifier (SID) of the network node, and wherein an SID of one network node comprises an identifier of the network node and a transmission resource requirement that needs to be allocated by the network node to the forwarding path.

14. The apparatus according to claim 13, wherein the computer program further includes instructions to:
- allocate the transmission resource to the forwarding path from a transmission resource of an outbound interface based on a transmission resource requirement comprised in an SID of the first network node in the segment identifier list, wherein the outbound interface is an outbound interface that is of the first network node and that is connected to a second network node, and wherein the second network node is a next-hop network node of the first network node on the forwarding path.

15. The apparatus according to claim 12, wherein the transmission resource requirement comprises a quantity of target slots or a target bandwidth, wherein the quantity of target slots is a quantity of slots required by the network node to forward a service flow, and wherein the target bandwidth is a bandwidth required by the network node to forward the service flow.

16. An apparatus, comprising:
one or more processors; and
a non-transitory computer readable medium having a computer program stored thereon for execution by the one or more processors to establish a forwarding path and act as a second network node, the computer program including instructions to:
- receive a path establishment request packet, wherein a packet header of the path establishment request packet comprises path information, wherein the path information is carried in a segment routing header (SRH) of a path establishment request packet, and wherein the path information comprises an identifier of a network node on the forwarding path and a transmission resource requirement that needs to be allocated by the network node to the forwarding path;
- allocate a transmission resource to the forwarding path based on the path information; and
- send the path establishment request packet.

17. The apparatus according to claim 16, wherein the path information comprises a segment identifier list, wherein the segment identifier list comprises a segment identifier (SID) of the network node, and wherein an SID of one network node comprises an identifier of the network node and a transmission resource requirement that needs to be allocated by the network node to the forwarding path.

18. The apparatus according to claim 17, wherein the instructions to allocate the transmission resource to the forwarding path include instructions to:
- allocate the transmission resource to the forwarding path from a transmission resource of an outbound interface based on a transmission resource requirement comprised in an SID of the second network node in the segment identifier list, wherein the outbound interface is an outbound interface that is of the second network node and that is connected to a third network node, and the third network node is a next-hop network node of the second network node on the forwarding path.

19. The apparatus according to claim 16, wherein the transmission resource requirement comprises at least one of a quantity of target slots or a target bandwidth, wherein the quantity of target slots is a quantity of slots required by the network node to forward a service flow, and wherein the target bandwidth is a bandwidth required by the network node to forward the service flow.

* * * * *